(12) United States Patent
Birman et al.

(10) Patent No.: US 8,214,305 B1
(45) Date of Patent: Jul. 3, 2012

(54) PATTERN MATCHING SYSTEM AND METHOD FOR DATA STREAMS, INCLUDING DEEP PACKET INSPECTION

(75) Inventors: Mark Birman, Palo Alto, CA (US);
Andrew Rosman, Palo Alto, CA (US);
Pankaj Gupta, Palo Alto, CA (US);
Ashish Goel, Palo Alto, CA (US)

(73) Assignee: NetLogic Microsystems, Inc., Irvine, CA (US)

( * ) Notice: Subject to any disclaimer, the term of this patent is extended or adjusted under 35 U.S.C. 154(b) by 863 days.

(21) Appl. No.: 12/313,868

(22) Filed: Nov. 24, 2008

(51) Int. Cl.
*G06F 15/18* (2006.01)
(52) U.S. Cl. .......................................... 706/12
(58) Field of Classification Search .......................... None
See application file for complete search history.

(56) References Cited

U.S. PATENT DOCUMENTS

| | | | |
|---|---|---|---|
| 6,266,262 B1 | 7/2001 | Washburn et al. | |
| 6,744,652 B2 | 6/2004 | Srinivasan et al. | |
| 6,967,855 B2 | 11/2005 | Srinivasan | |
| 6,993,622 B2 | 1/2006 | Khanna | |
| 7,174,419 B1 | 2/2007 | Ichiriu | |
| 7,210,003 B2 | 4/2007 | Khanna et al. | |
| 7,237,058 B2 | 6/2007 | Srinivasan | |
| 7,412,516 B1 | 8/2008 | Brown | |
| 7,440,304 B1 | 10/2008 | Raj | |
| 2008/0192523 A1* | 8/2008 | Mondaeev | 365/49.17 |
| 2009/0323383 A1* | 12/2009 | Mondaeev et al. | 365/49.17 |

OTHER PUBLICATIONS

Katz et al., "Gigabit Rate Packet Pattern-Matching Using TCAM", Technical Report No. UCS/CSD-4-1431, Jul. 2004, Computer Sciences Division (EECS), University of California, Berkeley, California, 94720, USA.

* cited by examiner

*Primary Examiner* — Jeffrey A Gaffin
*Assistant Examiner* — Li-Wu Chang
(74) *Attorney, Agent, or Firm* — Sterne, Kessler, Goldstein & Fox PLLC

(57) ABSTRACT

A data stream search system can include a plurality of search data inputs logically divided into at least M+N sets. The sets have a logical order with respect to one another, each set providing more than one bit value. A key application circuit can comprise a plurality of data paths that each couple a different group of at least M data input sets to a corresponding content addressable memory (CAM) section. Each different group of at least M data input sets can be contiguous with respect to the logical order, and shifted in bit order from one another by at least two bits.

24 Claims, 19 Drawing Sheets

| MAP_APP | Key (<0) | Key (<1) | Key (<2) | Key (<3) |
|---------|----------|----------|----------|----------|
| 0 | BLOCK0 | BLOCK1 | BLOCK2 | BLOCK3 |
| 1 | BLOCK3 | BLOCK0 | BLOCK1 | BLOCK2 |
| 2 | BLOCK2 | BLOCK3 | BLOCK0 | BLOCK1 |
| 3 | BLOCK1 | BLOCK2 | BLOCK3 | BLOCK0 |

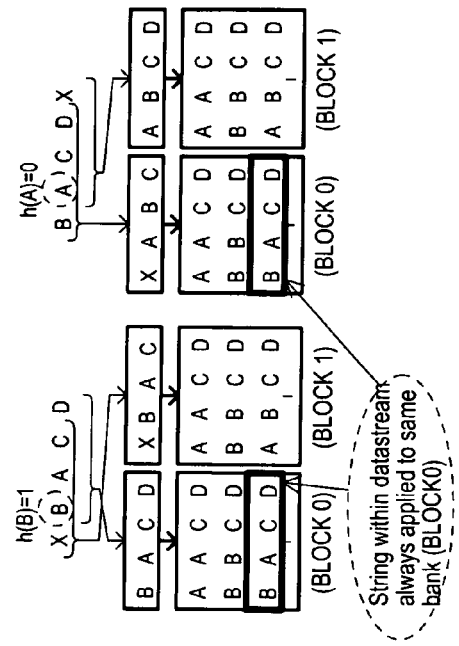
FIG. 24A
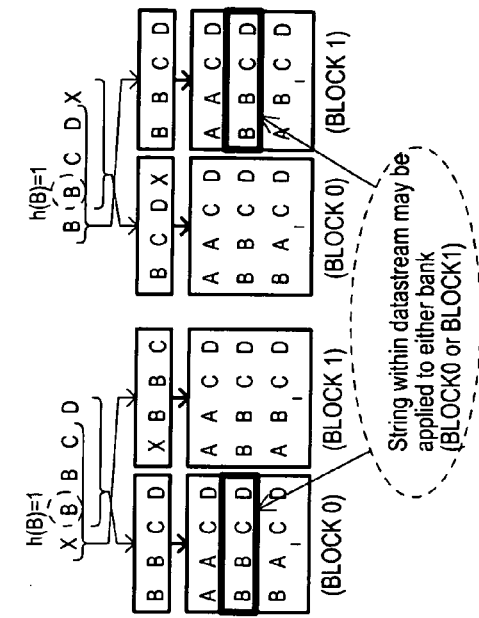
FIG. 24B
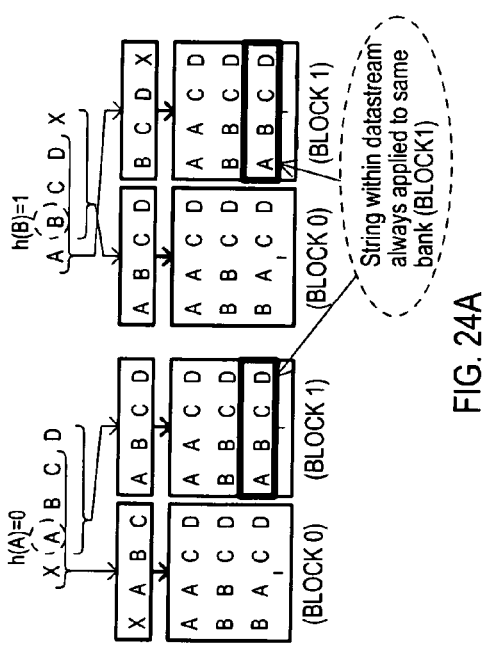
FIG. 24C
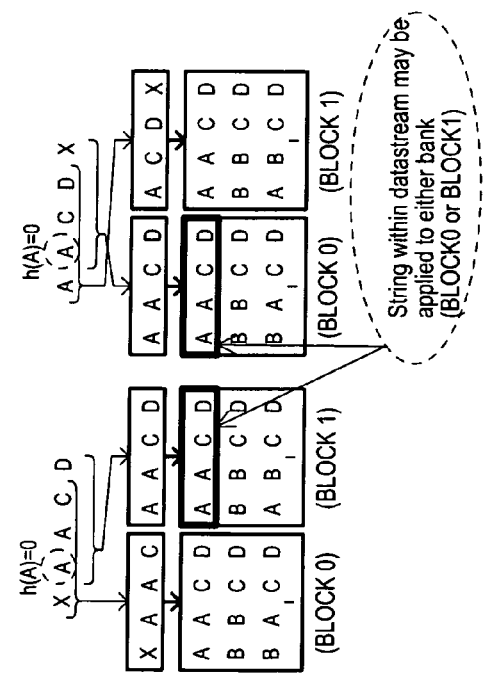
FIG. 24D
FIG. 23

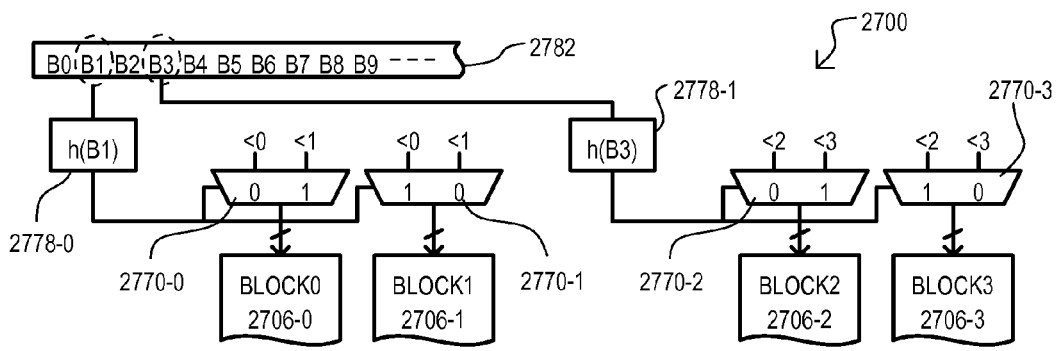
FIG. 27
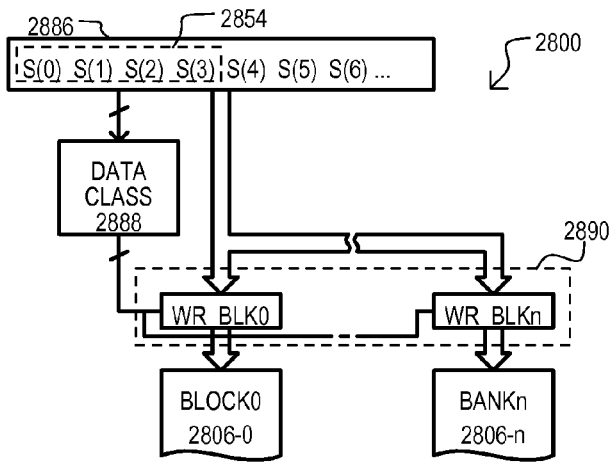
FIG. 28
FIG. 29
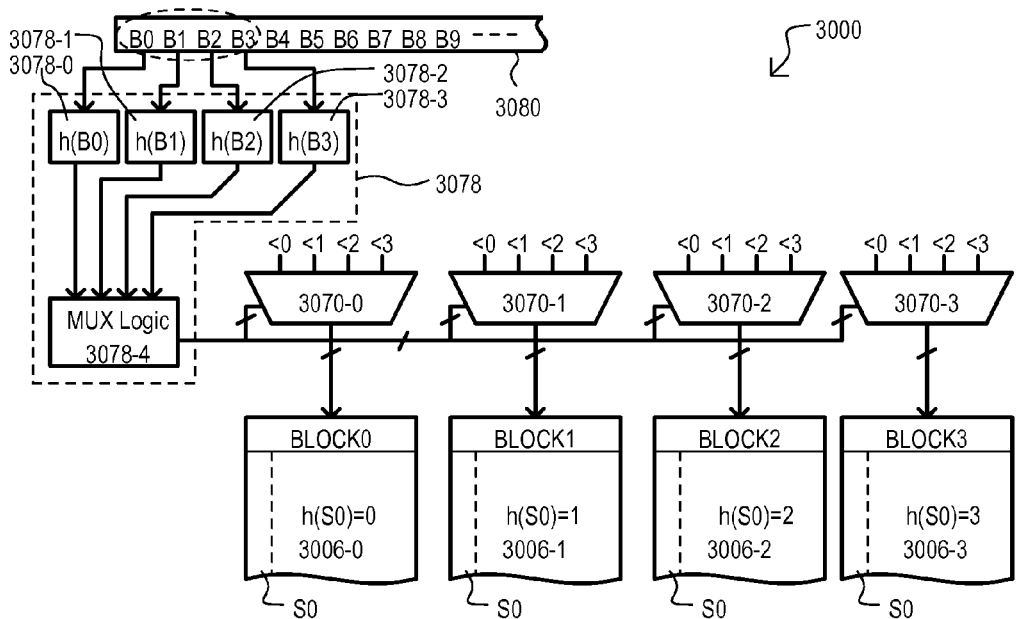
FIG. 30

PATTERN MATCHING SYSTEM AND METHOD FOR DATA STREAMS, INCLUDING DEEP PACKET INSPECTION

TECHNICAL FIELD

The present invention relates generally to systems for identifying a pattern present in a stream of data, and more particularly to systems for detecting predetermined bit patterns present in network packet data.

BACKGROUND OF THE INVENTION

Data packet based communication systems can encapsulate a data payload with a header containing protocol dependent fields for directing the transmission and/or processing of data packets. Typical data packet processing hardware can inspect such header data when determining where to forward the packet or whether to allow such a packet to enter a particular portion of a network. Typical packet inspection can operate on header fields and dispose of a packet according to a set of rules. Such rules can be based solely on header fields (can be stateless), or can take into account a packet position within a stream of packets (can be state oriented).

However, in order to help ensure that data packet content is benign, or to provide more sophisticated packet processing, it can be desirable to inspect an entire packet, including the packet payload. Unfortunately, such "deep" packet inspection can require undesirably long processing times, restricting packet throughput.

BRIEF DESCRIPTION OF THE DRAWINGS

FIG. 23 is a table showing mapping operation results for a system having two CAM blocks.

FIGS. 24A to 24D show how all values of a database need not be replicated in all CAM blocks.

FIG. 27 is a block diagram showing a system that includes two operations in parallel with one another.

FIG. 28 is a block diagram showing a system that can classify search string values for a database "on-the-fly".

FIG. 29 is a table showing reductions in database size that can be achieved with some embodiments.

FIG. 30 is a block diagram of another system having no replication of database across multiple CAM blocks.

DETAILED DESCRIPTION

Various embodiments of the present invention will now be described in detail with reference to a number of drawings. The embodiments show systems and methods for detecting a particular pattern contained with a sequence of data, where such detection can occur at relatively rapid speeds by incorporating pattern databases replicated across multiple content addressable memory (CAM) blocks. Such a replication of databases is in contrast to conventional CAM device applications that typically do not replicate databases in order to prevent multiple matches for a same search key value.

Figure 1:
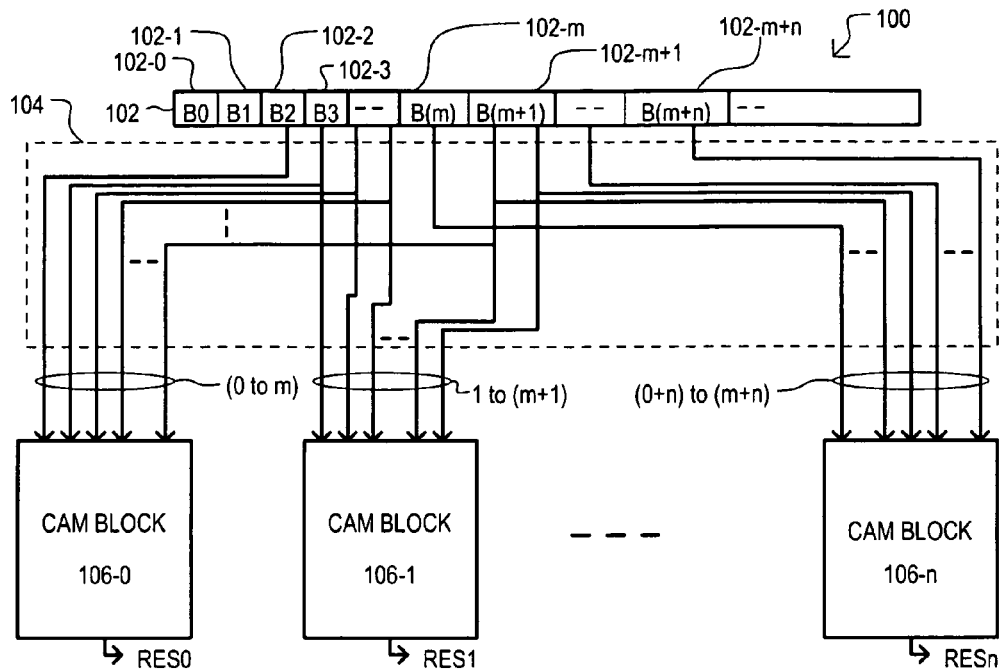
FIG. 1 is a block schematic diagram showing a first embodiment of the invention.

Referring now to FIG. 1, a system according to a first embodiment is shown in a block schematic diagram and designated by the general reference character 100. A system 100 can include a search key input 102, a shifting section 104, and a number of CAM blocks 106-0 to 106-$n$. A search key input 102 can be divided into a number signal sets, shown as 102-0 to 102-$m+n$. Each signal set (102-0 to 102-$m+n$) can receive multiple bits in parallel. Preferably, signal sets (102-0 to 102-$m+n$) are uniform in size, receiving a same number of bits. In one particular example, each signal set (102-0 to 102-$m+n$) can receive 8-bits (a byte). However, alternate embodiments can include signal sets having larger or smaller numbers of bits.

Signal sets (102-0 to 102-$m+n$) can have a logical order with respect to one another. In the example shown, signal line sets (102-0 to 102-$m+n$) have an order indicated by their trailing number identifier (i.e., "B0" to "B(m+n)"). In one particular arrangement, such an order can represent an ordering of data within a packet, even more particularly, a data stream of a packet being inspected.

A shift section 104 can connect various signal sets to each CAM block (106-0 to 106-*n*), where the signal sets are shifted from one another with respect to the logical order of the input data stream. In the example shown, a shift section 104 can provide m+1 signal sets (e.g., m+1 bytes) to each CAM block, with each signal set being different from one another by one set, while at the same time being contiguous with respect to the logical order. Thus, CAM block 106-0 can receive a first group of m+1 signal sets (B(0) to B(m)). A next CAM block 106H-1 can receive another group of m+1 signal sets, but shifted by one set with respect to that of CAM block 106-0. Thus, FIG. 1 shows CAM block 106-1 can receive signal line sets B(1) to B(m+1). In the example shown, such a shifting can continue until CAM block 106-*n* receives a last group of m+1 data sets (i.e., B(0+n) to B(m+n)). As will be understood by embodiments below, such a shifting can allow rapid search of a data stream for matching search patterns (e.g., strings), and such data stream portions can be searched in parallel allowing for rapid search speeds.

A shift section 104 can take a number of forms, including "hardwired" data paths, or circuits that can enable shifting by selectable amounts and/or a selectable direction. Examples of such arrangements are described in more detail below. A shift section 104 can receive data sets 102-0 to 102-(*m+n*) in parallel, and provide the different groups (B(0) to B(m), B(1) to B(m+1), etc.) in parallel to corresponding CAM blocks (106-0 to 106-*n*). Such an arrangement can allow for rapid processing of an incoming data stream.

CAM blocks (106-0 to 106-*n*) can receive data from shift section 104 and execute a compare operation on such data. CAM blocks (106-0 to 106-*n*) can allow masking of compare operations along data set boundaries, and preferably include "full" ternary CAM (TCAM) cells that allow masking along bit boundaries. As will be understood from other embodiments below, TCAM cells can allow search patterns of varying size to be stored in entries of uniform size by masking unused portions of such entries. In addition, in the embodiment shown, compare operations can be executed on shifted, consecutive (i.e., contiguous) data sets in parallel. Thus, each CAM block (106-0 to 106-*n*) can output a match result RES0 to RESn that can reflect the results of compare operations within each CAM block. As but one example, in the event a value received on the corresponding data sets matches data in one or more entries of a CAM block (106-0 to 106-*n*), the CAM block can output an index value representing a physical location of a highest priority matching CAM entry.

Preferably, search key input 102, shifting section 104, and CAM blocks (106-0 to 106-*n*) are sections of a same integrated circuit, allowing for rapid generation of match results.

While FIG. 1 shows an arrangement with n+1 CAM blocks, alternate embodiments can include as few as two CAM blocks, with one CAM block receiving non-shifted data (e.g., B(0) to B(m)), and the other CAM block receiving shifted data (e.g., B(1) to B(m+1)). That is, while the embodiment includes multiple CAM blocks in parallel, the particular number utilized should not be construed as limiting to the invention. That said, increasing the number of CAM blocks can increase the overall processing rate for incoming data but may reduce a maximum database size in cases using database replication.

In this way, a set of inputs can be applied in parallel to multiple CAM blocks in groups that are shifted with respect to one another.

Figure 2:
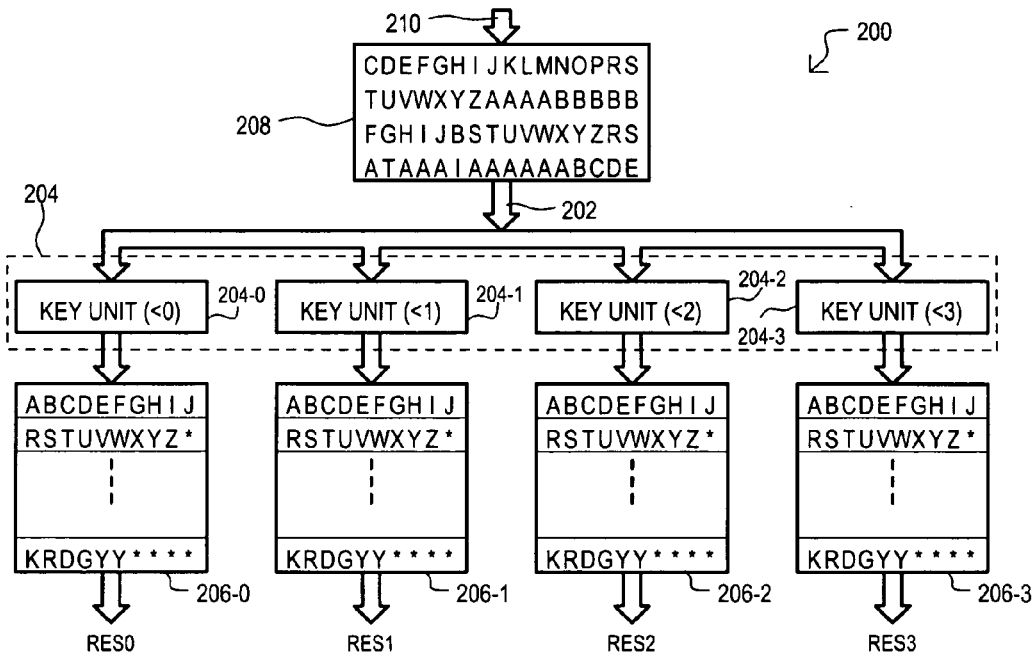
FIG. 2 is a block schematic diagram showing a second embodiment of the invention.

Referring now to FIG. 2, a system according to a second embodiment is shown in a block schematic diagram and designated by the general reference character 200. In one very particular arrangement, system 200 can represent one example of a system like that of FIG. 1.

Like the arrangement of FIG. 1, system 200 can include a search key input 202, a shift section 204, and CAM blocks 206-0 to 206-3. System 200 can further include a context buffer 208.

FIG. 2 also shows examples of a datastream to be searched (values stored in within context buffer 208), as well as search data (e.g., a database of strings) stored within CAM blocks (206-0 to 206-3) that is to be compared against portions of the incoming datastream. In the example of FIG. 2, these data values are represented by capital letters, but are not meant to be limited to any particular data format (i.e., not necessarily implying ASCII text, etc.) but rather to be an abstract representation of particular bit patterns. While letters shown in FIG. 2 can preferably represent a data unit of one byte, other embodiments can include division of strings and the datastream along smaller or larger bit boundaries.

A context buffer 208 can receive data from a data stream input 210, and output data on a search key input 202 of a shift section 204. Preferably, a context buffer 208 can receive input data from data stream input 210 while data is being output to search key input 202. In one very particular example, a context buffer 208 can be a dual port memory device having a first port (operating as a write port) connected to data stream input 210 and a second port (operating as a read port) connected to search key input 202. Even more preferably, a context buffer 208 can be a "circular" buffer, writing data to a first addressable entry after writing data to the last addressable entry (assuming such first addressable entry is available for such a write). Similarly, data can be read at consecutively higher addressable entries until a last address is reached. Data can then be read from a first addressable entry (assuming such first addressable entry is available for such a read).

Context buffer 208 can store data values in a logical order, and output portions of such data values in the same logical order. In the example of FIG. 2, the order is from left to right, starting at a bottom row. Further, context buffer 208 can output search key data corresponding to the number data shift operations taking place. For example, if a key size of "m" data units is applied to each CAM block (206-0 to 206-3) and CAM blocks (206-0 to 206-3) provide shifting of data by up to 3 data units, a context buffer 208 can output consecutive groups of search key data of the m+3 data units. This will be described in more detail with reference to FIGS. 3A to 3D.

In the embodiment of FIG. 2, a shift section 202 can include a number of key shift units 204-0 to 204-3, each corresponding to a CAM block (206-0 to 206-3). Each key shift unit (204-0 to 204-3) can be configured to shift (or not shift) received search key data to generate applied search key data for the corresponding CAM block (206-0 to 206-3). FIG. 2 shows an example in which key shift units (204-0 to 204-3) are configured to provide increasingly larger shift amounts. Thus, key shift unit 204-0 provides no shift. Key shift unit 204-1 provides a shift of one data unit, key shift unit 204-2 provides a shift of two data units, and key shift unit 204-3 provides a shift of three data units.

CAM blocks (206-0 to 206-3) can include a number of CAM entries, each of which can store all or a portion of a search data value. Such a collection of search values can represent a search database. In the example of FIG. 2, search data values are replicated across all CAM blocks (206-0 to 206-3). Further, search data values are ordered in terms of size, with unused portions of entries being masked to force a "match" result (masked portions are shown by an asterisk "*"). Thus, the illustrated search database can include a first (and longest) search value "ABCDEFGHIJ" that can completely fill a CAM block entry. A second search value "RSTUVWXYZ" can be shorter than the first search data value by one data unit, and thus masks a last data unit within its corresponding entry.

Each CAM block (206-0 to 206-3) can generate a result value RES0 to RES3 that reflects a compare result between a received key value and search values stored within the CAM block.

As in the case of FIG. 1, preferably, a system 200 can be included in a single integrated circuit device.

Having described the general structure and contents of a system 200, particular examples of operations for the system 200 will now be described with reference to FIGS. 3A to 3D.

Figure 3A:
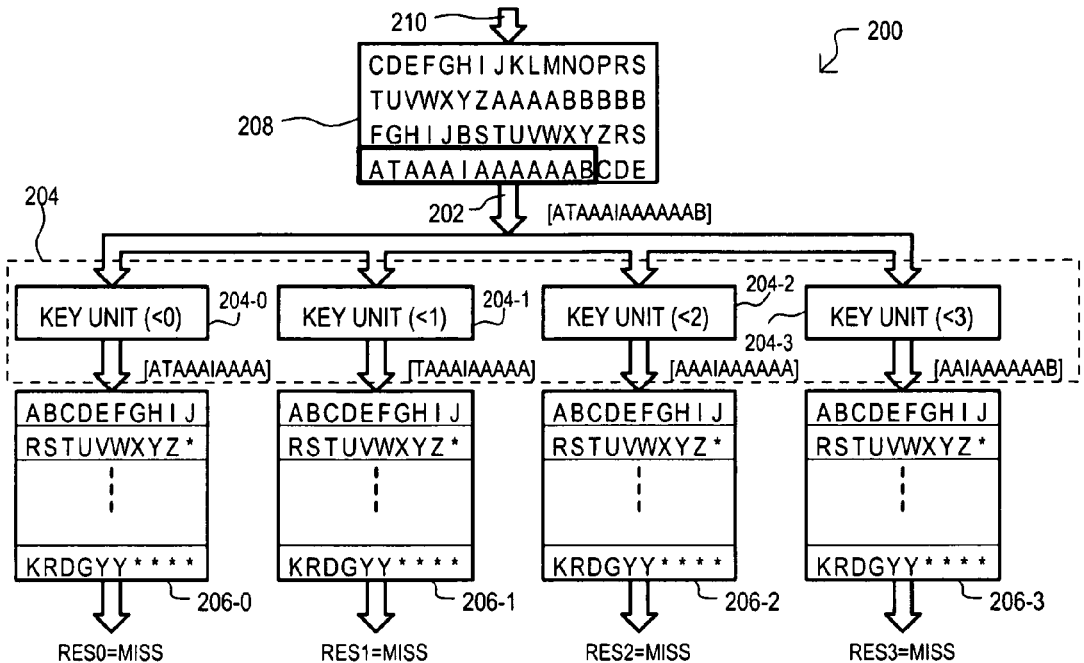
FIG. 3A is a block schematic diagram showing a third embodiment of the invention.

Referring now to FIG. 3A, a first search cycle for system 200 can begin with a first set of key values being read out from context buffer 208 to key shift units (204-0 to 204-3). In the very particular example shown, each key shift unit (204-0 to 204-3) applies a key of 10 data units. Further, as noted previously, a maximum shift amount is three data units. Thus, a context buffer 208 can provide at least 10+3=13 data units. Accordingly, in the first search cycle shown in FIG. 3A, context buffer 208 outputs a first 13 data units of search key data (shown as [ATAAAIAAAAAAB]) to key shift units (204-0 to 204-3).

Referring still to FIG. 3A, in the operation shown, a key shift unit 204-0 is configured to provide no shift (<0), thus received search key data is only truncated before being applied to corresponding CAM block 206-0. This is shown as value [ATAAAIAAAA] output from key shift unit 204-0. In contrast, key shift unit 204-1 is configured to provide a shift of one data unit (<1), and so ignores a first data unit and last two data units, to output a value [TAAAIAAAAA] to corresponding CAM block 206-1. In the same fashion, larger shift amounts are implemented for the remaining two key shift units (204-2 and 204-3), resulting in key values of [AAAIAAAAAA] and [AAIAAAAAAB] being applied to CAM blocks 206-2 and 206-3, respectively. In the example of FIG. 3A, these applied search key values do not match any entries in the search value database, thus results RES0 to RES3 are all "MISS" (i.e., no matches found).

Figure 3B:
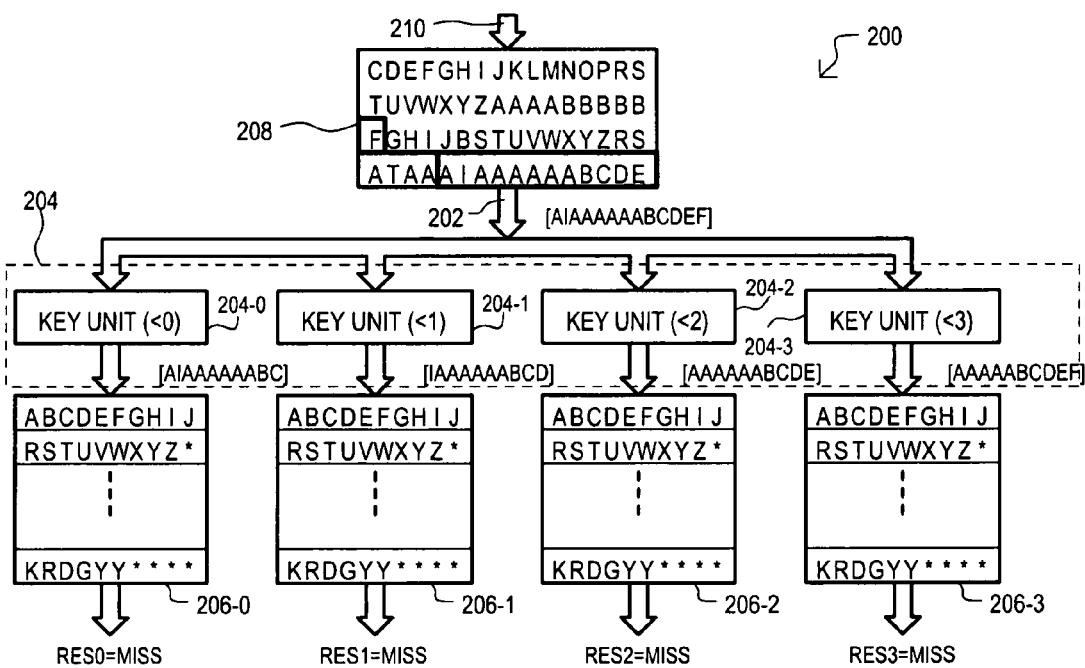
FIGS. 3B to 3D show selected operations for the embodiment of FIG. 3A.

Referring now to FIG. 3B, a second search cycle for system 200 can begin with a next set of key values being read out from context buffer 208 to key shift units (204-0 to 204-3). As noted previously, during such search operations, data can be output from a context buffer 208 in a step wise fashion, with a step size (n+1) corresponding to the amount by which search key value is being shifted (n). In FIGS. 3A to 3D, a maximum shift is 3 data units, thus each consecutive read from a context buffer 208 can be along step sizes of 3+1=4 data units. Thus, in the second search cycle shown in FIG. 3B, context buffer 208 outputs a next 13 data units of search key data (shown as [AIAAAAAABCDEF], starting four data units forward (in the logical order) with respect to the previous 13 data units.

Referring still to FIG. 3B, key shift units (204-0 to 204-3) provide the same shifting action as the previous cycle, resulting in values [AIAAAAAABC], [IAAAAAABCD], [AAAAAABCDE], and [AAAAABCDEF] being applied to CAM blocks 206-0 to 206-3, respectively. Again, in the example shown, the applied search key values do not match any values of the replicated databases, thus results RES0 to RES3 are all "MISS".

Figure 3C:
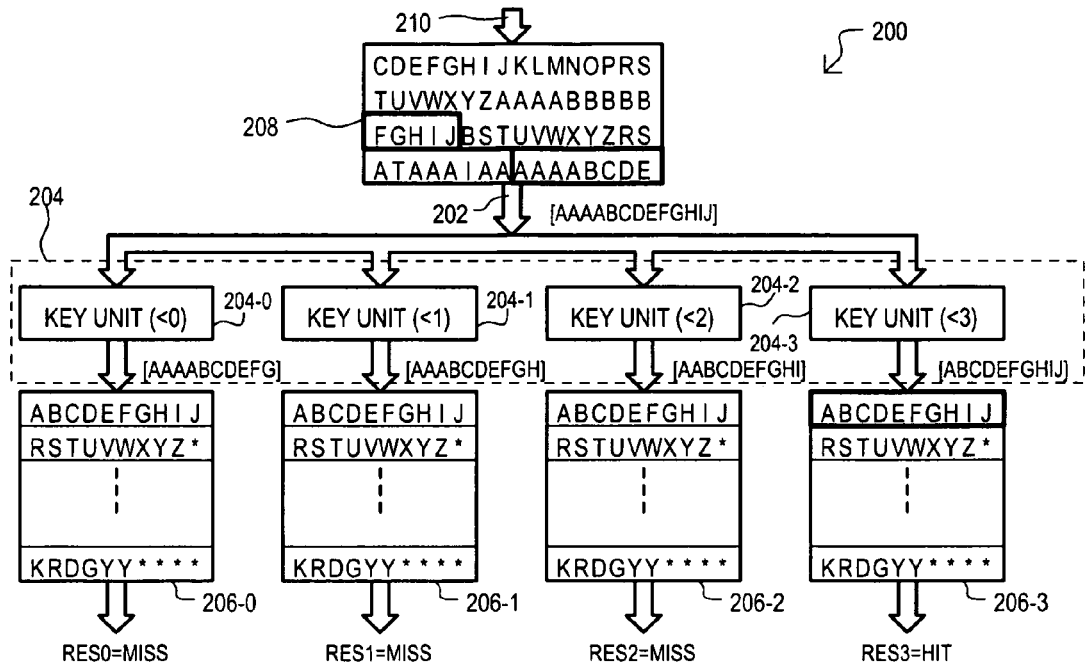

Referring now to FIG. 3C, a third search cycle is shown for system 200. Data is once again output from context buffer 208 along step wise boundary of 4 data units, resulting in key value [AAAABCDEFGHIJ] being provided to key shift units (204-0 to 204-3). Key shift units (204-0 to 204-3), in turn, can provide shifted key values [AAAABCDEFG], [AAABCDEFGH], [AABCDEFGHI] and [ABCDEFGHIJ] to CAM blocks 206-0 to 206-3, respectively. Key value [ABCDEFGHIJ] applied by key shift unit 204-3 matches the first search data value of the replicated database, thus CAM block 206-3 can provide a result value indicating a hit RES3=HIT (i.e., at least one entry matches).

Figure 3D:
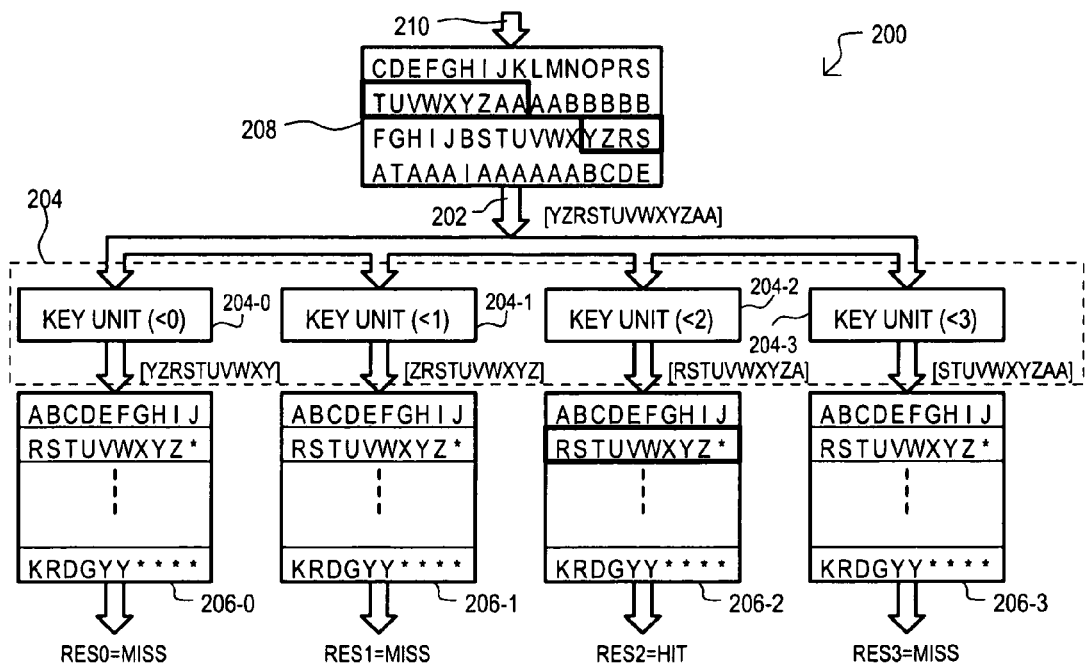

Referring now to FIG. 3D, an eighth search cycle for the system 200 is shown. It is understood that in previous third through seventh search cycles, context buffer 208 has continued to output key data value in groups of 13 contiguous data units, taken by moving forward by four data units each cycle. As shown, search key data [YZRSTUVWXYZAA] can be output from context buffer 208 and shifted by key shift units (204-0 to 204-3). A key value [RSTUVWXYZA] output from key shift unit 204-2 matches a second search value "RSTUVWXYZ" of the data base (the last data unit being masked), resulting in CAM block 206-2 providing a match result value RES2=HIT.

In this way, contiguous portions of a data stream, shifted by different amounts, can be applied to CAM blocks in parallel, where each such CAM block stores a same database. Such an arrangement can allow for rapid pattern searching of a stream of data values. While FIGS. 2 to 3D show an arrangement in which four CAM blocks are searched in parallel, a system can include greater or fewer sets of CAM blocks. Assuming a same CAM device capacity, utilizing fewer CAM blocks can result in slower throughput of search results, but can allow for greater size databases. Conversely, utilizing greater numbers of CAM blocks can provide for faster search throughput at the cost of less storage area for replicated databases.

While FIGS. 1 and 2 have shown systems in which all CAM blocks are configured to store a same search value database, on other embodiments, CAM blocks and associated key shift units can be configurable to allow multiple databases to reside within a same device. An example of such a configurable arrangement is shown in FIGS. 4A to 4C.

Figure 4A:
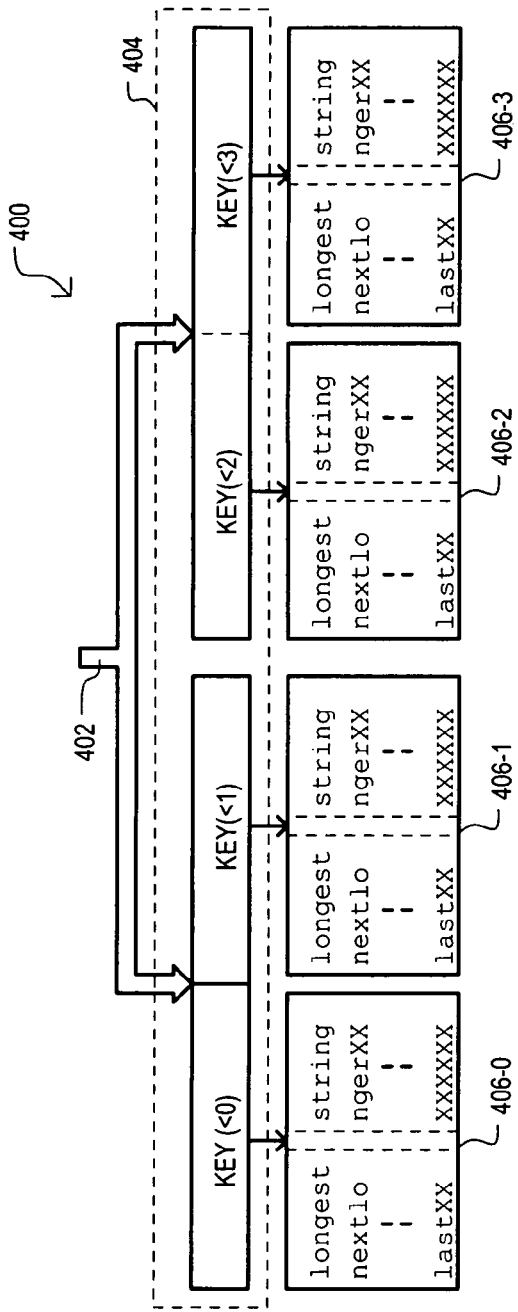
FIGS. 4A to 4C are block schematic diagrams showing a fourth embodiment of the invention, and operations therefor.
Figure 4B:
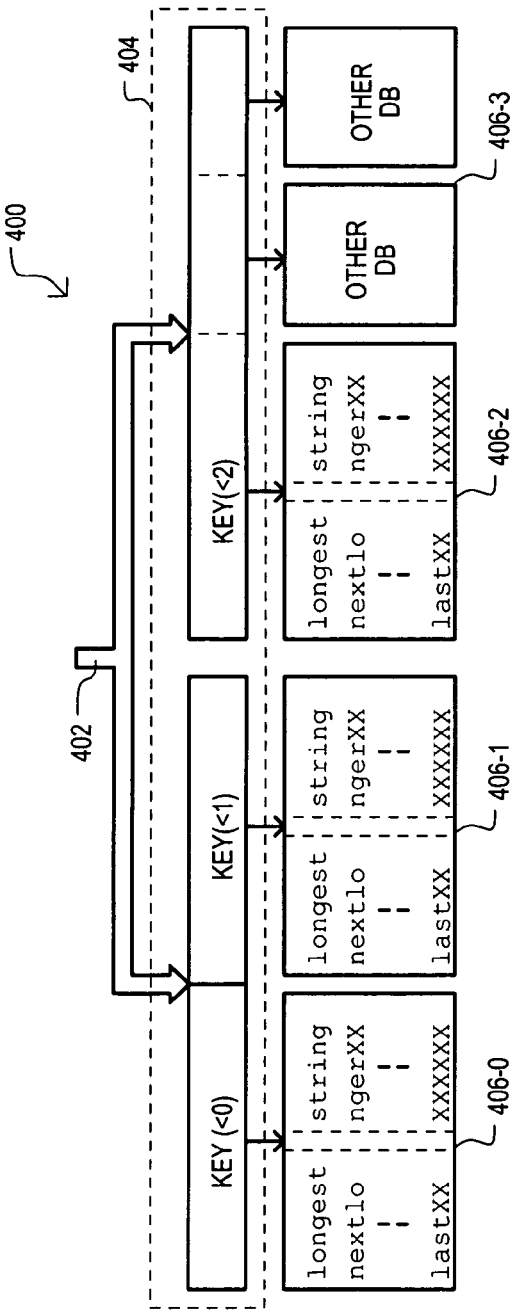
Figure 4C:
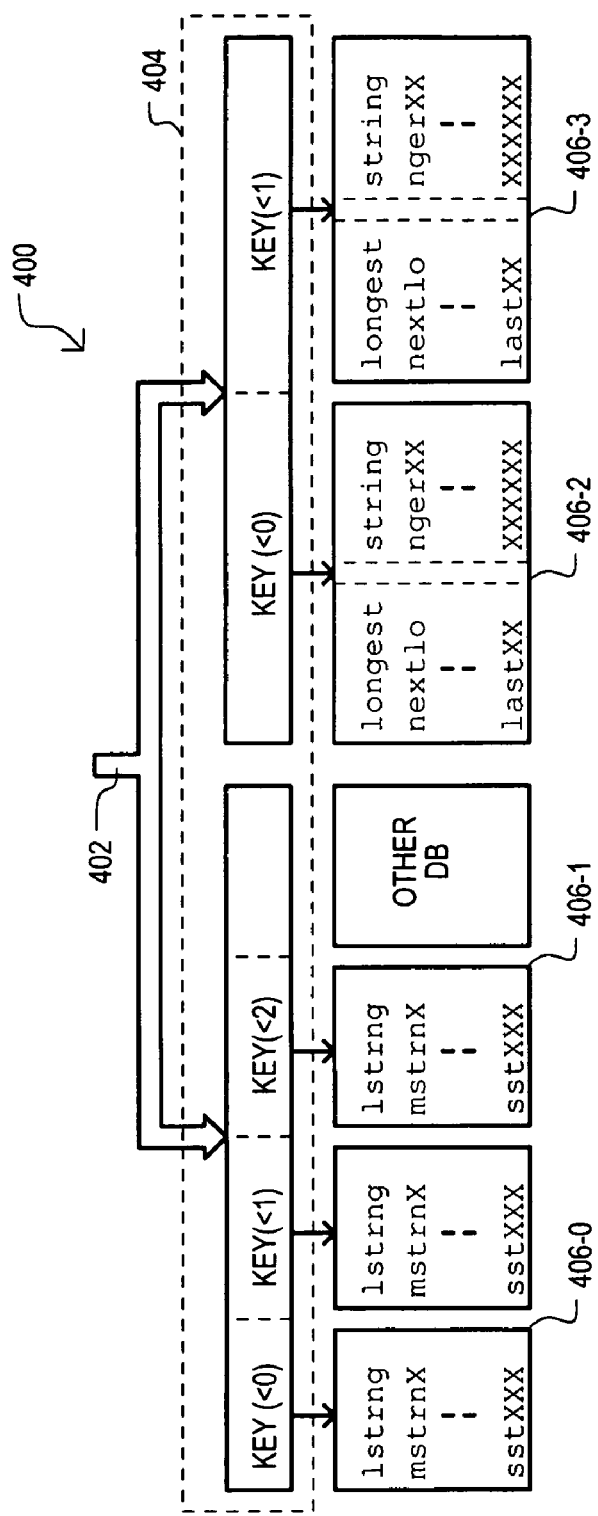

FIGS. 4A to 4C shows a same system 400 configured in various ways. A system 400 can include a search key input 402, a configurable shift section 404, and CAM blocks (406-0 to 406-3). In very particular arrangements, a system 400 can represent one example of that shown in FIG. 1, or a portion of that shown in FIG. 2.

In the arrangement of FIGS. 4A to 4C, each CAM block (406-0 to 406-3) can include two sections that can be searched separately (using two smaller search keys), or together (using a single longer search key).

FIG. 4A show a configuration like that of FIG. 2, in which a same database is replicated across all four CAM blocks (406-0 to 406-3) with key shift units (404-0 to 404-3) shifting received key data by increasing amounts.

FIG. 4B shows an arrangement in which one CAM block 406-3 does not include a database present in the other CAM blocks 406-0 to 406-2, and thus can be excluded from "shifted" searches like those executed on CAM blocks 406-0 to 406-2. As a result, key shift unit 404-3 does not shift data in such searches.

FIG. 4C shows an arrangement in which a first database can be replicated only across both halves of CAM block 406-0 and one half of CAM block 406-1. Key shift unit 404-0 can provide appropriate shifting for keys to the halves of its corresponding CAM block 406-0. At the same time, a second database, having wider search values than that of the first database, can be replicated across CAM blocks 406-2 and 406-3.

In this way, key shift units can shift data for only selected sections of a CAM device and/or some key shift units can shift data for application to one database, while another set of key shift units can shift data for a different database.

Search operations like those noted above will be referred to herein as "stream searches", as they can be used to search a stream of data for particular patterns. While CAM blocks can be used to store a replicated database for stream searches, the same CAM blocks can be used to store other databases for non-stream searches (i.e., searches that do not involve shifting of search data across two or more CAM blocks). Thus, particular embodiments can include shift sections that selectively activate key shifting operations based on the type of search. One example of such an arrangement is shown in FIGS. 5A and 5B.

Figure 5A:
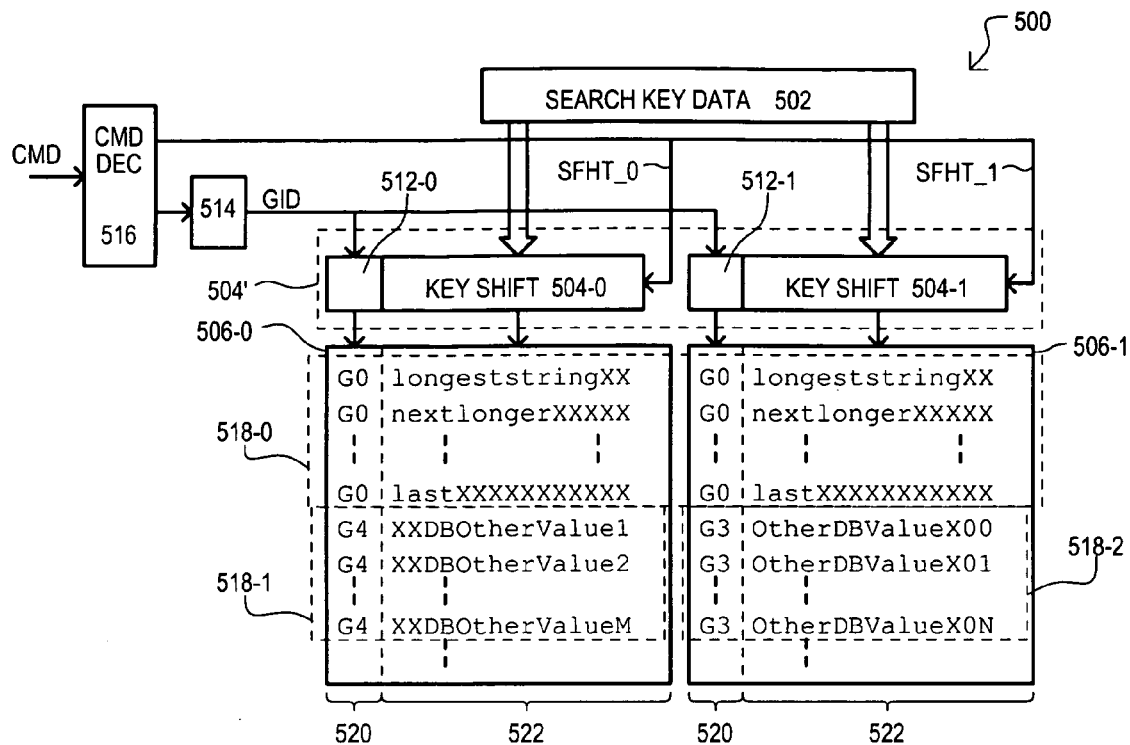
FIG. 5A is a block schematic diagram showing another embodiment of the invention.
Figure 5B:
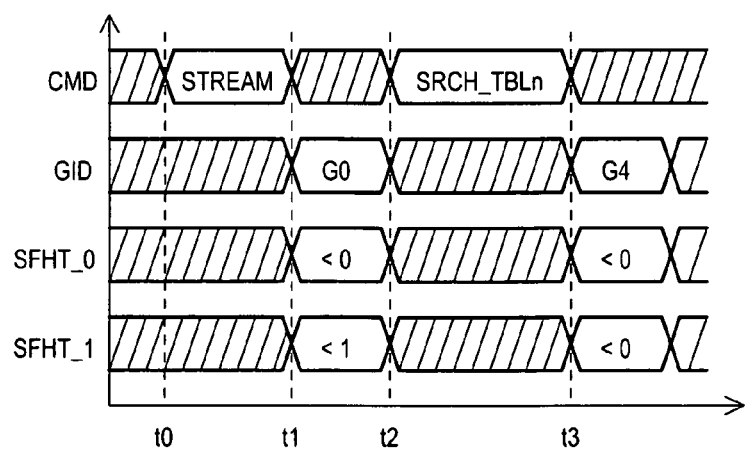
FIG. 5B is a timing diagram showing selected operations for the embodiment of FIG. 5A.

Referring to FIG. 5A, another system is shown in a block schematic diagram and designated by the general reference character 500. A system can include a search key input 502, a shift section 504', and CAM blocks (506-0 and 506-1). In addition, a system 500 can include a group ID control circuit 514 and a command decoder circuit 516. In very particular arrangements, a system 500 can represent one example of that shown in FIG. 1 or 4A, or a portion of that shown in FIG. 2.

In the example of FIG. 5A, CAM block 506-0 can store two databases: a first database 518-0, which is a stream search database, and a second database 518-1, which is not a stream search database. First and second databases (518-0 and 518-1) are distinguishable according to a group ID value. A first database 518-0 can include a group ID value of "G0", while second database 518-1 can include a group ID value of "G4". Similarly, CAM block 506-1 includes two databases: a replicated version of first database 518-0, as well as a non-stream search third database 518-2. Group ID value "G0" distinguishes first database 518-0 from third database 518-2, which has a group ID value of "G3". Thus, entries within both CAM blocks (506-0 and 506-1) can be conceptualized as having a group ID field 520 and a search value field 522. Such an arrangement can allow a single CAM structure to provide pattern matching results with replicated databases, as well as single database pattern matching.

A shift section 504' can include key shift units 504-0 and 504-1 and a group identification (ID) circuit 512-0 and 512-1, corresponding to CAM blocks 506-0 and 506-1, respectively. Each key shift unit (504-0 and 504-1) can provide a key value that is shifted by a predetermined number of data units (or not shifted) based on a corresponding shift control signal SHFT_0 and SHFT_1. Outputs from key shift units (504-0 and 504-1) can be applied to search value fields of CAM blocks (506-0 and 506-1). Group ID circuits (512-0 and 512-1) can output group ID key values based on inputs received from GID control circuit 514. Outputs from group ID circuits (512-0 and 512-1) can be applied to group ID fields of CAM blocks (506-0 and 506-1).

A group ID control circuit 514 can control which group ID values are applied to a CAM block based on decoded search command. As but one example, a group ID control circuit 514 can include storage registers selectable by a search profile indicated by search command data. Thus, group ID values can be selectable by a user.

A command decoder circuit 516 can receive command data, and in response, provide control values to group ID control circuit 514, as well as shift values (SHFT_0 or SHFT_1) to key shift units (504-0 and 504-1).

Having described the general arrangement of a system 500, the operation of such a system will now be described with reference to FIG. 5B. FIG. 5B is a timing diagram showing responses that are generated for both a stream search and a non-stream search. FIG. 5B includes a waveform "CMD" that can represent command data, "GID" that can represent a key group ID value, and waveforms for shift values SHFT_0 and SHFT_1.

At about time t0, a command decoder 516 can receive command data indicating a stream search "STREAM".

At about time t1, in response to stream search command data, a command decoder 516 can output control signals to group ID control circuit 514 that result in key group ID value G0 being output from group ID circuits 512-0 and 512-1. In addition, command decoder 516 can output shift values indicating different shifting amounts for key values applied to replicated databases. In the example shown, shift value SHFT_0 can indicate no shifting (<0), while shift value SHFT_1 can indicate a shift of one data unit (<1).

At about time t2, a command decoder 516 can receive command data indicating a non-stream search "SRCH_T-BLn".

At about time t3, in response to the non-stream search command data, a command decoder 516 can output control signals to group ID control circuit 514 that result in key group ID value G4 being output from group ID circuits 512-0 and 512-1. In addition, command decoder 516 can output shift values indicating no shifting (e.g., SHFT_0=SHFT_1=(<0)).

In this way, a system can selectively provide data shifting in response to command data, allowing for both stream and non-stream type searching of a same CAM block.

Embodiments above have illustrated arrangements in which databases can include search values that fit within one CAM entry. In some cases it may be desirable to search for patterns that are longer than one CAM entry. To accomplish such a task, match results for one portion of such long patterns can be combined ("stitched") with match results on another portion to determine if an entire pattern has been matched. Thus, such stitching can allow a system to accommodate very long search patterns that can exceed a native size of a CAM entry.

Figure 6A:
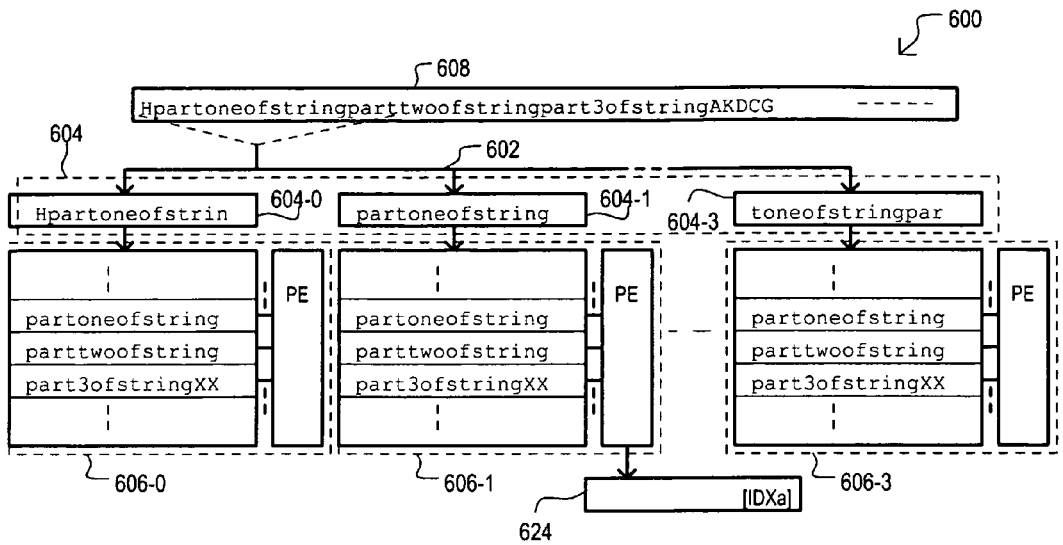
FIGS. 6A to 6C are block schematic diagrams showing another embodiment of the invention, and operations therefor.
Figure 6B:
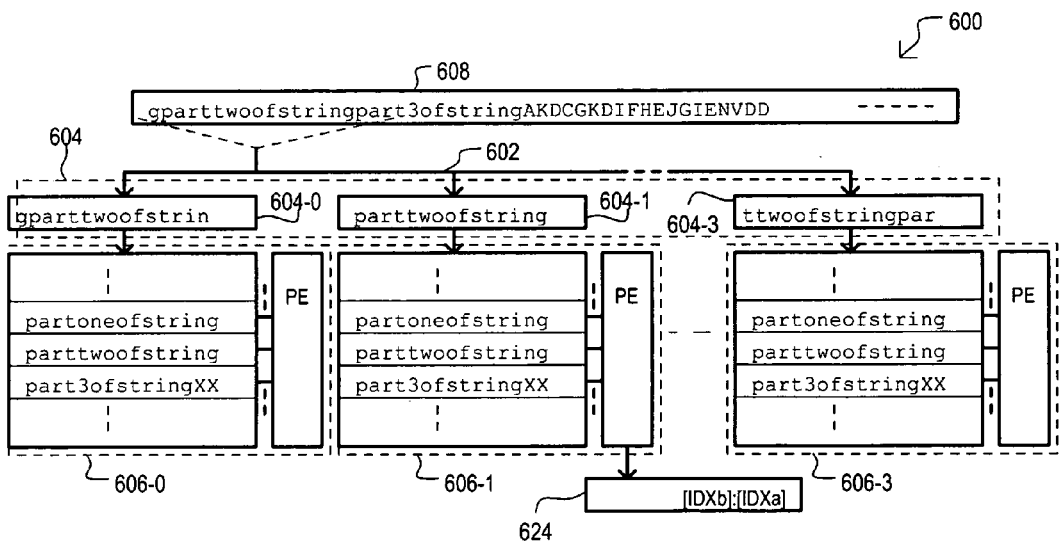
Figure 6C:
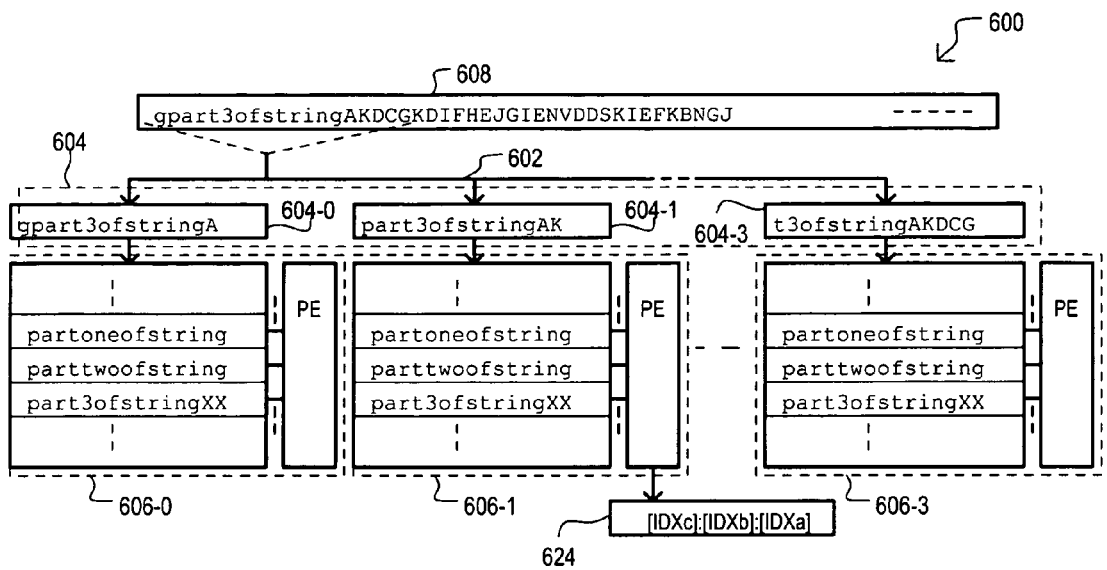

An embodiment that can provide for such long pattern matches is shown in FIGS. 6A to 6C.

FIGS. 6A to 6C show a system 600 that can include some of the same general sections as that shown as 100 in FIG. 1, thus like sections are referred to by the same reference character but with the first digit being a "6" instead of a "1". In very particular arrangements, a system 600 can represent one example of that shown in FIGS. 1, 2, 4A or 5.

In FIGS. 6A to 6C, each CAM block (606-0 to 606-3) is shown to include a corresponding priority encoder (PE). Each PE can generate an index value corresponding to a matching CAM entry based on a predetermined priority. For example, index values can be based on a physical address of a CAM entry, or alternatively, an index value can be programmable for each CAM entry, or for groups of CAM entries.

In addition, the embodiment of FIGS. 6A to 6C also shows an index buffer 624. An index buffer 624 can store indices generated by search operations for subsequent processing to determine if a long string match exists.

FIGS. 6A to 6C shows an example of matching to a "long" pattern that spans three CAM entries.

Referring to FIG. 6A, a first portion of a data received in a context buffer 608 can be applied, in a shifted fashion as described above, to CAM blocks (606-0 to 606-3). As shown, an entry within CAM block 606-1 can match the applied portion of a search key value, resulting in the generation of an index value IDXa. Such a value can be stored in an index buffer 624.

Referring now to FIG. 6B, in a next search step, a second group of data for application to CAM blocks (606-0 to 606-3) can be retrieved by jumping to a next position in the context buffer based on maximum pattern segment size. In the example shown, an entry within CAM block 606-1 can match the applied portion of the search key value, resulting in the generation of another index IDXb. Index value IDXb can be stored within index buffer 624 with index value IDXa.

Referring now to FIG. 6C, in a third search step, a third group of data for application to CAM blocks (606-0 to 606-3) can be retrieved by moving forward in the stream based, once again, on maximum pattern segment size. In the example shown, an entry within CAM block 606-1 can match the applied portion of the search key value, resulting in the generation of another index IDXc.

It is noted that while the three matching portions of the long pattern [partoneof string], [parttwoofstring] and [part3ofstringXX] are shown in physically adjacent entries, such an arrangement should not be construed as limiting, as it can be the index values generated that indicate corresponding pattern portions.

Similarly, the different matching operation shown in FIGS. 6A to 6C need not be executed consecutively. However, context should be maintained with respect to generated indices to ensure captured index values correspond to consecutive data stream portions.

It is also noted that after stepping through the context buffer in multiple steps, a system 600 can repeat the same process after stepping forward a number of data units corresponding to the number of CAM blocks arranged in parallel (in this example four data units).

In this way, a system can apply multiple segments in a shifted fashion to CAM blocks in parallel to detect patterns larger in size than a single CAM entry.

Figure 7A:
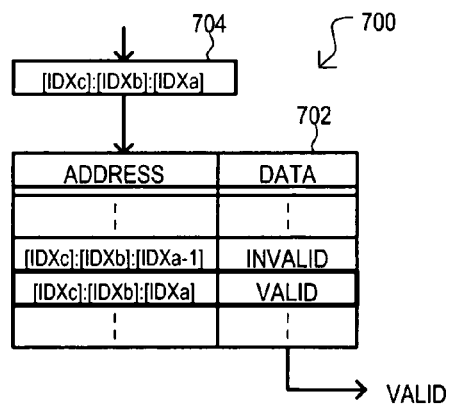
FIGS. 7A and 7B are block schematic diagrams of long pattern detection circuits that can be included in embodiments of the present invention.
Figure 7B:
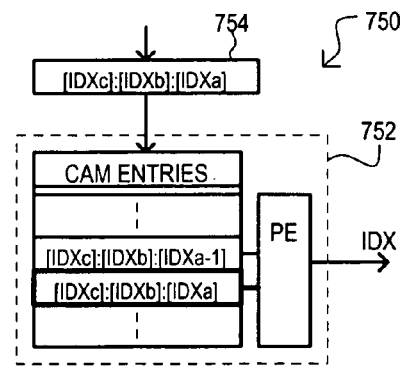

Referring now to FIGS. 7A and 7B, two approaches to detecting long patterns based on a set of generated indices are shown in block schematic diagrams. Referring to FIG. 7A, a long pattern detection section 700 can include a randomly accessed memory structure 702, having an address input that can receive index data from an index buffer 704. In one particular arrangement, an index buffer 704 can correspond to that shown as 624 in FIGS. 6A to 6C. As but two examples, a randomly accessed memory structure 702 can be random access memory, or read-only-memory, having addressable locations that can be accessed according to particular index combination values. In response to such values memory structure 702 can output a value indicating if the pattern represents a valid match (VALID or INVALID).

Referring now to FIG. 7B, a long pattern detection section according to another embodiment is shown in a block schematic diagram and designated by the general reference character 750. Long pattern detection section 750 can include a content addressable memory (CAM) portion 752 having a search key input that can receive index data from an index buffer 754. As in the case of FIG. 7A, in one particular arrangement, an index buffer 754 can correspond to that shown as 624 in FIGS. 6A to 6C. A CAM portion 752 can include a number of entries that store index combinations for comparison with those generated in response to a long pattern search operation.

Thus, in one arrangement, if application of an index combination generates a HIT within CAM portion 752, such a result can indicate a valid match with a long pattern.

It is noted that in arrangements like those shown in FIGS. 7A and 7B, while an index combination can be full index values concatenated with one another, alternatively, such values can be only portions of index values (e.g., portions generated by ignoring more significant bits) or value generated by some operation on index values (e.g., hashing function).

While the embodiment of FIGS. 6A to 6C has shown an arrangement in which all of multiple portions of a long pattern can be replicated across multiple CAM portions and compared to a stream of search key data, alternate embodiments can utilize parallel shifted searching to detect only one portion of a long pattern with the remaining portions of a pattern being detected without a shifted CAM search. An example of such an arrangement is shown in FIG. 8.

Figure 8:
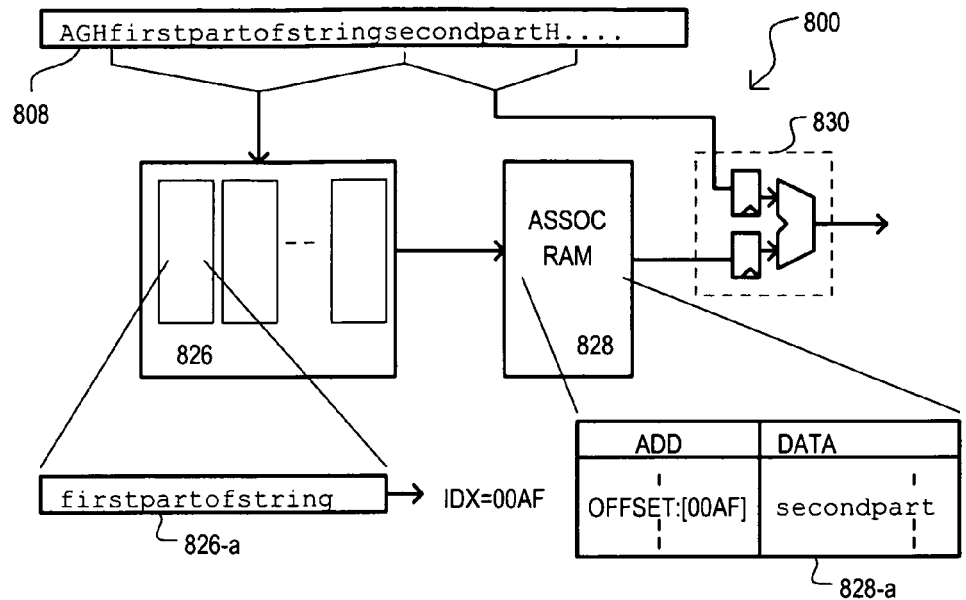
FIG. 8 is a block schematic diagram of a system according to another embodiment.

Referring now to FIG. 8, a system 800 for detecting patterns having a size larger than a CAM entry width is shown in a block schematic diagram. A system 800 can include a CAM sub-system 826, a memory 828, a context buffer 808, and a compare circuit 830. A CAM sub-system 826 can provide parallel shifted matching as described in the embodiments above, including a replicated database across multiple CAM blocks. However, unlike the embodiment of FIGS. 6A to 6C, only a portion of a long pattern can be stored within each CAM block. One example of a CAM entry within CAM sub-system 826 is shown as 826-a. The pattern "firstpartofstring" is understood to represent but one portion of a larger pattern to be detected. Further, in the arrangement shown, a match result for such a first portion can generate an index value IDX=:00AF. A CAM sub-system 826 can add an offset value OFFSET to index values generated in response to a match.

A memory 828 can include a number of addressable locations accessible according to match indications generated by CAM sub-system 826. As but one example, a memory 828 can be a random access memory (RAM), preferably a static RAM (SRAM) for fast access times. A memory 828 can store second portions of search patterns that can be accessed by a corresponding index values generated when a match is determined for a first part of a long search pattern. The example of FIG. 8 shows one example of a location 828-a in memory 828. Location 828-a includes a data value "secondpart" accessible at address OFFSET:[00AF]. Thus, if CAM sub-system 826 determines one portion of an incoming data stream matches "firstpartof string", a value OFFSET:[00AF] will be output to memory 828. In response, memory 828 can output data value "secondpart".

A context buffer 808 can store search key data for application to both CAM sub-system 826 and compare circuit 830. More particularly, a context buffer 808 can provide a first portion of search key data by stepping through a data stream in groups of data units corresponding to the number of CAM blocks arranged in parallel within CAM sub-system 826. In addition, in response to a match indication, a context buffer can provide a second portion of the search key data to compare circuit 830. Such a second portion of search key data can be taken from the end of the first search key portion, starting at a location dependent upon which CAM block generates the match indication.

A compare circuit 830 can compare data output from memory 828 with second search key portions provided from context buffer 808. If compared data values match, long pattern match can be considered valid. It is noted that a compare circuit 830 can provide bit masking in compare operations in the event memory 828 stores variable length values.

In this way, a system can include parallel and shifted CAM block matching in combination with a conventional memory, such as a RAM, to provide long pattern matching.

While embodiments above have shown systems that store all or only a portion of a long pattern (e.g., a pattern wider than a CAM entry), other embodiments can store both long patterns and short patterns (e.g., patterns that fit within one CAM entry). Examples of such embodiments will now be described.

Figure 9A:
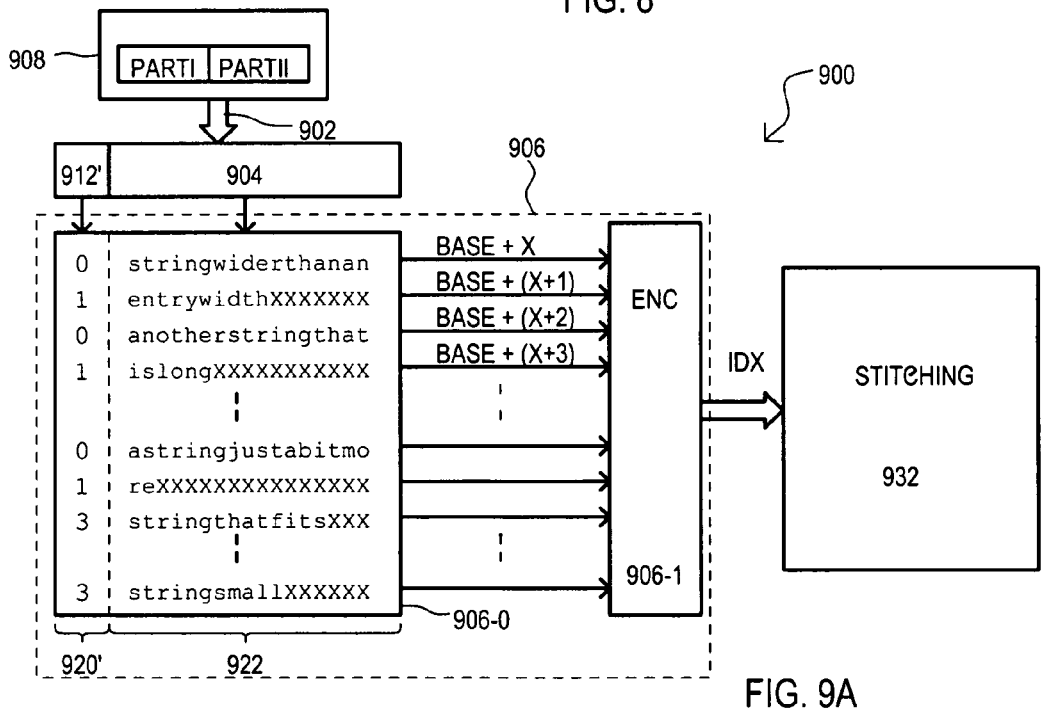
FIG. 9A is a block schematic diagram showing another embodiment of the invention.

Referring now to FIG. 9A a system according to another embodiment is shown in a block schematic diagram and designated by the general reference character 900. A system 900 can include a search key input 902, a shift section 904, a CAM block 906, a context buffer 908, an identification (ID) value circuit 912', and a stitching section 932. In the example of FIG. 9A, it is understood that CAM block 906, ID value circuit 912', and shift section 904 can be replicated multiple times to enable parallel and shifted application of search key portions as described herein, or by equivalent arrangements.

In the example shown, CAM block 906 can include a number of entries 906-0 that store search values that can be distinguished from one another with an ID code (shown as 0, 1, 3). Thus, CAM block entries 906-0 can each include an ID field 920' that stores an ID value, as well as a search value field 922. First portions of a long pattern can be designated by an ID code "0" while second portions of such long patterns can be designated by ID code "1". Further, in the example shown, short patterns can be designated by ID code "3". Different portions of a same long search pattern can have a predetermined physical relationship to one another. For example, a first portion of a long pattern can reside in an even address location, with a second portion of the same long pattern residing in the next odd address location.

CAM block 906 can also include a priority encoder 906-1 that prioritizes match indications based on physical location (e.g., address), and encodes a highest priority match indication into an index value.

A context buffer 908 can provide different portions of search key values in the same general fashion described in FIG. 6A. That is, a first portion of a search key value can be applied and searched in parallel across multiple CAM blocks. A second portion can then be applied by advancing forward in the context buffer by an amount equal to the maximum pattern size for entries in the CAM blocks.

A shift section 904 can provide a shifting of search key data as described in the embodiments above, to enable a same set of search key data to be applied to multiple CAM blocks, but shifted by different amounts for each CAM block.

An ID value circuit 912' can apply an ID value in parallel with search key data to designate the pattern, or pattern portion to be searched. Thus, when a context buffer 908 provides a first portion search key data for comparison against long search patterns, ID value circuit 912' can output a value "0". Similarly, when a context buffer 908 provides a second portion of search key data for comparison against long search patterns, ID value circuit 912' can output a value "1". Still further, when search key data is to be compared against short search patterns, ID value circuit 912' can output an ID value "3".

A stitching section 932 can distinguish between matches against long search patterns and matches against short search patterns. As but one example, matches for long patterns can be determined to be valid when indices corresponding adjacent CAM entry locations (even, odd) are generated in response to first and second portions of search key data, while matches for short patterns can be determined when one index value is generated from an appropriate CAM entry.

Having described portions of the system shown in FIG. 9A, one example of a matching operation will now be described with reference to FIG. 9B. At about time t0, a first portion of search key data (PARTI) can be applied in parallel to multiple CAM blocks in a shifted fashion. Along with search key data PARTI, ID value circuit 912' can apply ID value "0". Any match indications can be stored by stitching section 932.

At about time t1, a second portion of search key data (PARTII) can be applied in parallel to multiple CAM blocks in a shifted fashion, along with an ID value "1" generated by ID value circuit 912'. Again, any match indications can be stored by stitching section 932. It is noted that application of a second portion (PARTII) of search key data can be conditional on a first portion (PARTI) generating a match indication.

Following the applications of PARTI and PARTII, if appropriately related index values are generated (e.g., corresponding to adjacent CAM entries), a stitching section 932 can provide a long pattern detected result.

Figure 9B:
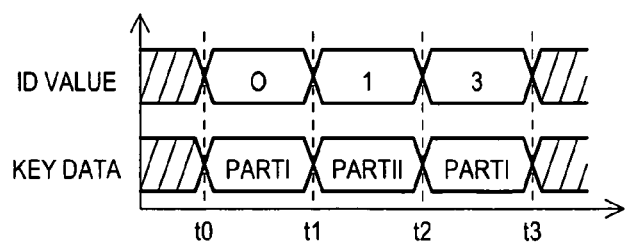
FIG. 9B is a timing diagram showing selected operations for the embodiment of FIG. 9A.

In the particular example of FIG. 9B, at about time t2, a first portion of search key data (PARTI) can again be applied but with an ID value of "3" being generated by ID value circuit 912'. Any match indication can be stored by stitching section 932. However, the generation of but one valid index value can be considered a match detection (to a short pattern).

Following time t3, search key data can be advanced by a number of data units corresponding to parallel CAM blocks, and the process repeated.

While a logical combining of match results can be based on generated index values, alternate embodiments can include built-in circuitry for selectively combining match indications generated by CAM entries. One example of such an embodiment is shown in FIG. 10.

Figure 10:
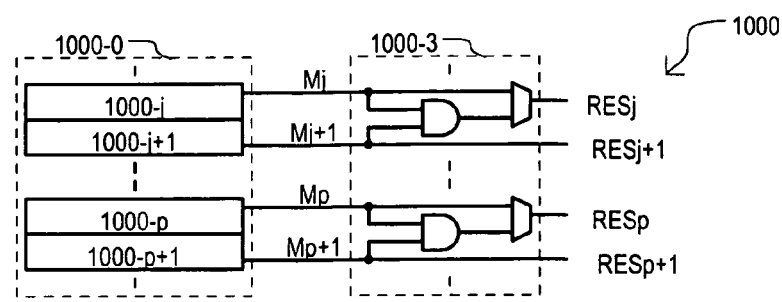
FIG. 10 is a block schematic diagram of one example of a content addressable memory (CAM) block that can be included in the embodiments.

FIG. 10 shows a CAM block 1000 that includes a number of CAM entries 1000-0 and combining logic 1000-3. CAM entries 1000-0 can each generate entry match results, shown in FIG. 10 as Mj, Mj+1, Mp, Mp+1. Combining logic 1000-3 can receive the entry match results, and provide final match results (RESj, RESj+1, RESp, RESp+1). Combining logic 1000-3 can operate to provide either a one-to-one correspondence between entry match results and final match results, or provide final match results that can represent the logical combination of multiple entry match results. The very particular example of FIG. 10 shows an arrangement in which final match results RESj and RESp can represent match indications for individual entries 1000-j or 1000-p, or the logical ANDing of match results for two adjacent entries.

Of course, FIG. 10 is but one example of logic for selectively combining match results from multiple entries, and should not necessarily be construed as limiting to the invention.

In this way, search values that are both larger than and smaller or equal to a CAM entry size can be replicated and searched in parallel in a same CAM block.

Figure 11:
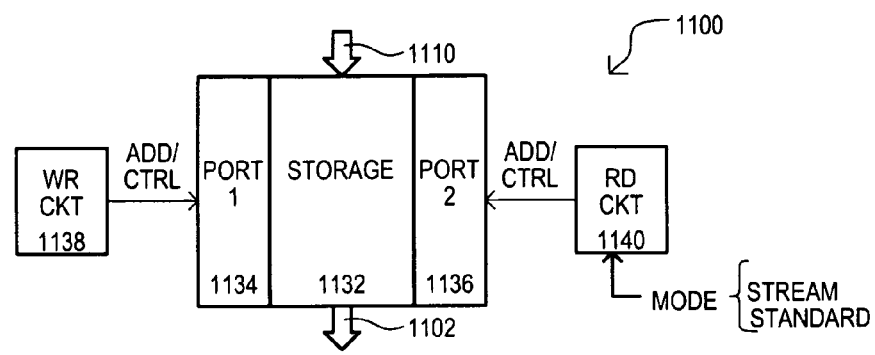
FIG. 11 is a block schematic diagram of one example of a context buffer that can be included in the embodiments.

Referring now to FIG. 11, one example of a context buffer that can be included in the embodiments is shown in a block schematic diagram and designated by the general reference character 1100. A context buffer 1100 can include a search key data input 1102, a data stream input 1110, a storage section 1132, a first access port 1134, a second access port 1136, a write control circuit 1138 and a read control circuit 1140. A storage section 1132 can include a number of storage locations for storing search key data received from data stream input 1110. According to applied address and control signals, such search key data can be output as data for search key data input 1102. Storage section 1132 preferably includes dual port storage locations. That is, locations within storage section 1132 can be accessed essentially simultaneously via two different paths.

A first access port 1134 can provide a first access path to locations within storage section 1132. In the very particular example of FIG. 11, a first access port 1134 can be a write port. In response to address and control signals, first access portion 1134 can write data values received at data stream input 1110 into locations of storage section 1132.

A second access port 1136 can provide a second access path to locations within storage section 1132. In the very particular example of FIG. 11, a second access port 1136 can be a read port. In response to address and control signals, second access port 1136 can read data values stored in storage sections 1132 to search key data input 1102.

A write control circuit 1138 can generate write addresses and control signals for first port 1134 to write data into the context buffer 1000. A context buffer 1000 can be a "circular" buffer, and thus write control circuit 1138 can return to a first address after writing to a last address. Similarly, a read control circuit 1140 can generate read addresses and control signals for second port 1136, to read data from context buffer 1000. It is noted that read control circuit 1140 can include a "stream" mode in which it can automatically retrieve consecutive portions a data stored in storage section 1132, and output such values for pattern searches such as those described herein. In addition, control circuit 1140 can also include a "standard" mode in which a discrete address, or set of addresses, is generated.

A dual port context buffer 1000 like that of FIG. 11 can advantageously allow for fast pattern searching in a stream of data, such as that utilized by "deep" packet inspection. As data is read out for search, new data can be being written into the buffer, allowing a continuous streaming of data and generation of match results when a pattern is detected.

In this way, a dual port context buffer can be utilized to provide search key data to CAM blocks. Dual port access can allow for rapid processing of an incoming data stream.

Figure 12:
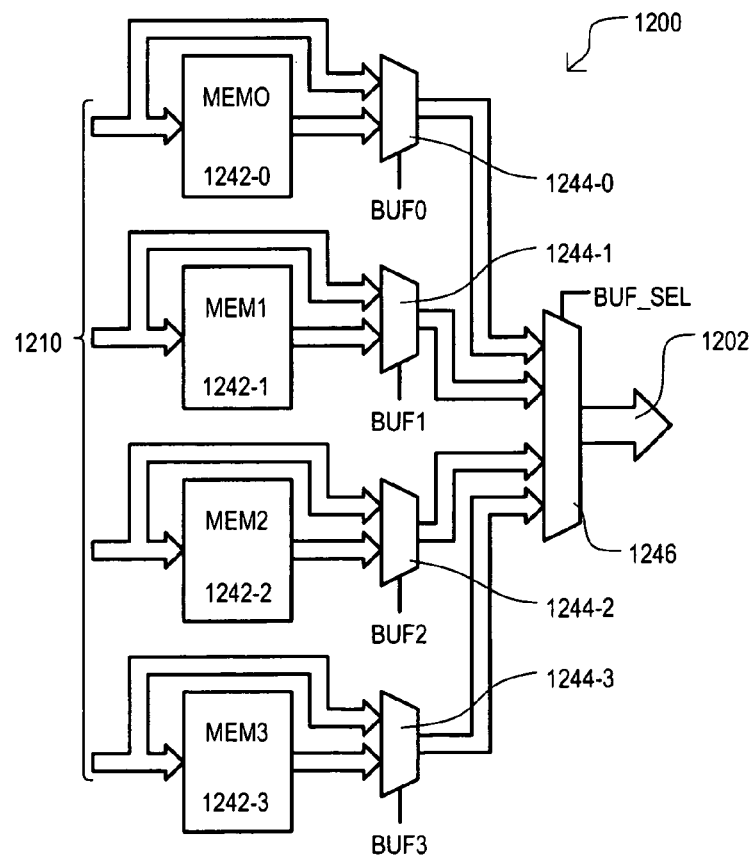
FIG. 12 is a block schematic diagram of another example of a context buffer that can be included in the embodiments.

Referring now to FIG. 12, a second example of a context buffer is shown in a block schematic diagram and designated by the general reference character 1200. Context buffer 1200 can include a search key input 1202, a data stream input 1210, a number of buffer sections 1242-0 to 1242-3, buffer output multiplexers (MUXs) 1244-0 to 1244-3 corresponding to each buffer section, and a search key input MUX 1246.

Buffer sections (1242-0 to 1242-3) can separately receive write data presented at data stream input 1210. In a preferred arrangement, each of buffer sections (1242-0 to 1242-3) can be dual port memory circuits.

Buffer output MUXs (1244-0 to 1244-3) can receive buffer control signals BUF0 to BUF3, and in response, output data from either the buffer section (1242-0 to 1242-3) or data stream input 1210. In this way, search key data can be applied to CAM blocks (not shown) from buffer sections (1242-0 to 1242-3) or a data stream input 1210. Such an arrangement can enable a context buffer to be continuously streaming data to search key input 1202 from any of buffer sections (1242-0 to 1242-3), stop such streaming to allow a different key value to applied via data stream input (e.g., a non-stream search), and then commence the stream search once again.

A search key input MUX 1246 can have separate inputs connected to the output of each buffer output MUX (1244-0 to 1244-3). In response to buffer select information (BUF_SEL), search key input MUX 1246 can input data provided by one of the buffer sections (1242-0 to 1242-3).

In this way, a context buffer can store data in multiple different sections, as well as provide direct paths for search key data that bypass such buffer sections.

Figure 13:
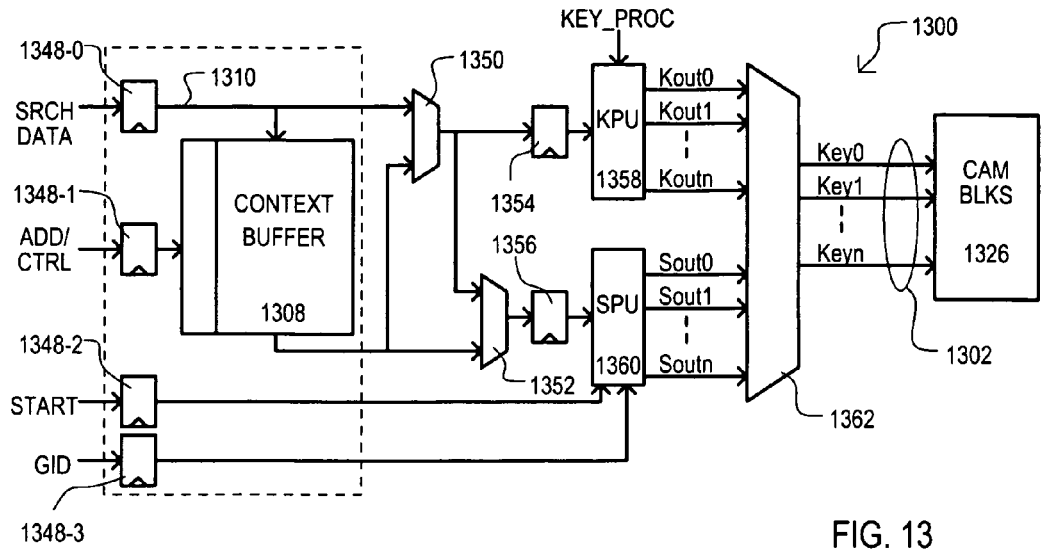
FIG. 13 is a block schematic diagram of another embodiment.

Referring now to FIG. 13, a search system according to yet another embodiment is shown in a block schematic diagram.

A search system 1300 can provide two different paths for processing search key data depending upon the type of search being performed. For searches aimed at applying one or more search keys to CAM blocks, a processing path can allow fields within received search key data to be manipulated (or not manipulated) to generate applied search key values (actual search values applied to the CAM blocks). In addition, a stream search path can be provided that can shift search key data by predetermined data units, as described by other embodiments herein.

Search system 1300 can include input registers 1348-0 to 1348-3, a context buffer 1308, a first data MUX 1350, second data MUX 1352, standard data register 1354, stream data register 1356, key processing unit 1358, shift processing unit 1360, an output MUX 1362, and a CAM sub-system 1326. Input register 1348-0 can receive search key data, and provide such data on data stream input 1310 to both context buffer 1308 and an input of first data MUX 1350. Input register 1348-1 can receive address and control information for writing data to or reading data from context buffer 1308. Input register 1348-2 can receive a value START that can indicate starting point at which search key data is provided in a shift search operation (e.g., stream search). Input register 1348-3 can receive a group ID value, like that previously described with reference to FIG. 5A.

First data MUX 1350 can receive input data at data stream input 1310 and data output from context buffer 1308, and output such data to either standard data register 1354 or as an input to second data MUX 1350. Standard data register 1354 can provide data to key processing unit 1358. In response to key processing data KEY_PROC, a key processing unit 1358 can manipulate key data to generate a number of applied key values (Kout0 to Koutn). As but one particular example, a key processing unit 1358 can allow manipulation of fields within a same initial search data set, such as moving groups of bits to different bit positions, while other bits are not moved.

Second data MUX 1352 can receive input data from first data MUX, or data output from context buffer 1308, and output such data to shift data register 1356. Shift data register 1356 can provide data to shift processing unit 1360. In response to a start value START, shift processing unit 1360 can provide multiple applied search key values (Sout0 to Soutn), each representing a different contiguous portion of a same data set, but shifted from one another by increasing larger numbers of data units. In addition, shift processing unit 1360 can receive an output a group ID value with such applied search key values. Such a group ID value can be replicated and included in each of applied search key values (Sout0 to Soutn).

An output MUX 1362 can selectively output a set of applied key values generated from key processing unit 1358 (Kout0 to Koutn) or shift processing unit 1360 (Sout0 to Soutn) to CAM sub-system 1326. A CAM sub-system 1326 can include multiple CAM blocks (not shown) capable of comparing received search key value to stored values essentially simultaneously.

In this way, a system can include separate search key processing paths for generating search keys that can be shifted for parallel search across multiple CAM blocks, as well as search keys generated by moving bit positions of one portion of data and not others.

Figure 14:
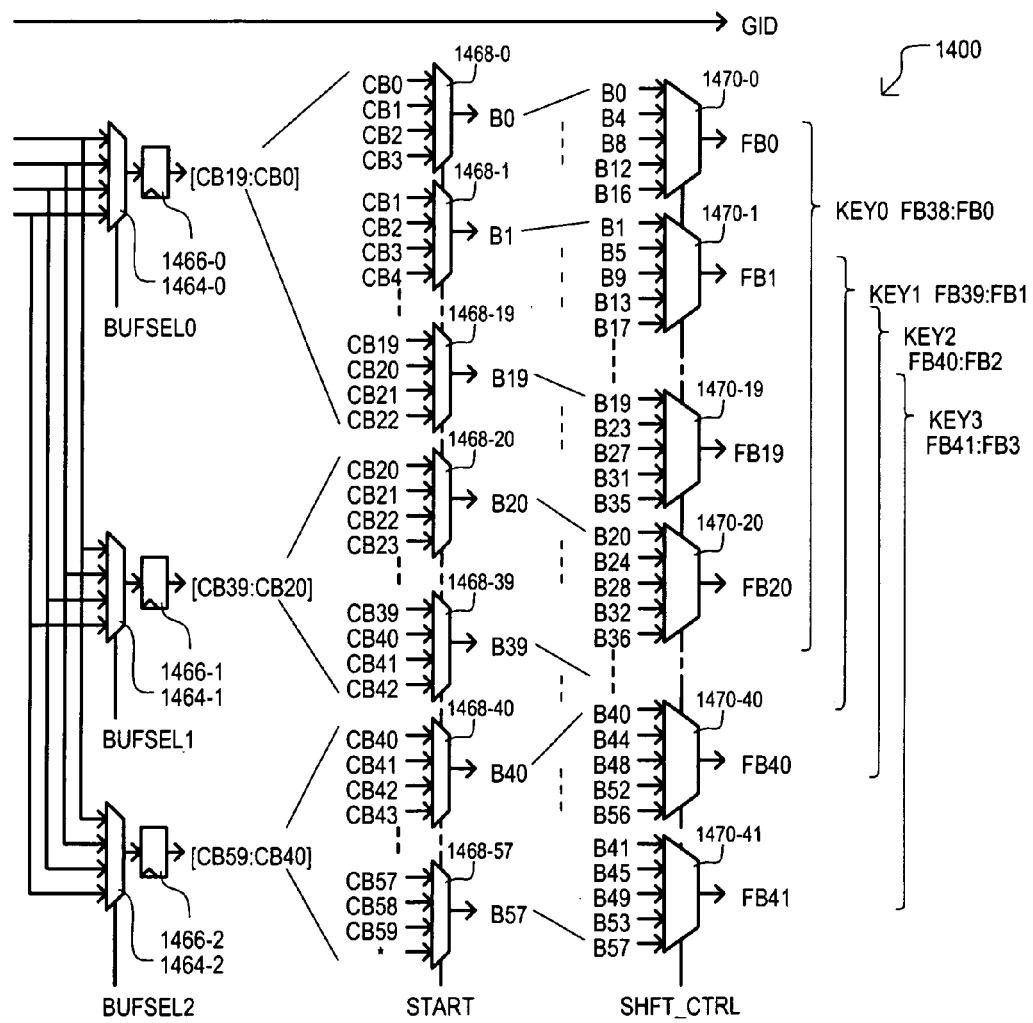
FIG. 14 is a block schematic diagram of a shift processing unit according to an embodiment of the present invention.

Having described a system that includes a shift processing unit, one example of a shift processing unit will now be described with reference to a block schematic diagram shown in FIG. 14. A shift processing unit 1400 can shift data along data unit boundaries, such as bytes, to provide multiple applied key values representing contiguous portions of the same data group, but shifted from one another by one data unit. Still further, the particular shift processing unit 1400 of FIG. 14 can enable key data to be generated at various starting points within a retrieved data set. Referring to FIG. 14, a shift processing unit 1400 can include input MUXs 1464-0 to 1464-2, input registers 1466-0 to 1466-2, start selection MUXs 1468-0 to 1468-57, and output MUXs 1470-0 to 1470-41. Input MUXs (1464-0 to 1464-2) can selectively input 60 data units of search key data from one of four different sources. As but one example, such search key data can be input from one of four context buffer sections. Data from input MUXs (1464-0 to 1464-2) can be latched and output by corresponding input registers (1466-0 to 1466-2). In the example shown, input registers 1466-0 to 1466-2 provide input data unit sets CB19:CB0, CB39:CB20, CB59:CB40, respectively, where the numbers 0 to 59 designate a logical order to the received search key data.

Input data unit sets CB0 to CB59 can be provided in an overlapping fashion to start selection MUXs (1468-0 to 1468-57). Each start selection MUX (1468-0 to 1468-57) can output a data unit, to provide a start data unit set B0 to B57. In the particular example of FIG. 14, start selection MUXs (1468-0 to 1468-57) can be commonly controlled by a start value START. Thus, if a START value causes the selection a first input of start selection MUXs (1468-0 to 1468-57), start data unit set B0:B57 can correspond to values CB0:CB57. In contrast, if a START value causes the selection a third input of start selection MUXs (1468-0 to 1468-57), start data unit set B0:B57 can correspond to values CB2:CB59. In this way, a set of contiguous data values can be selected at varying start positions of a received data stream.

Start data unit set B0:B57 can be provided to output MUXs (1470-0 to 1470-41) in groups that enable output MUXs (1470-0 to 1470-41) to provide contiguous groups of 42 data units, shifted from one another by a predetermined stepping amount, which in this example is four data units. Each output MUX (1470-0 to 1470-57) can output a data unit to provide applied data unit set FB0 to FB41. In the particular example of FIG. 14, output MUXs (1470-0 to 1470-41) can be commonly controlled by a shift control value SHFT_CTRL. Thus, if a SHFT_CTRL value causes the selection a first input of output MUXs (1470-0 to 1470-41), applied data unit set FB0:FB41 can correspond to start data units B0:B41. However, if a SHFT_CTRL value causes the selection a third input of output MUXs (1470-0 to 1470-41), then applied data unit set FB0:FB41 can correspond to start data units B12:B53. In this way, search key data can be provided in "steps" of four data units. Such an arrangement can allow an incoming stream of data to be continuously applied to different CAM sections for rapid search results. A stepping amount can be programmable. Thus, in an embodiment having three replicated databases, stepping can be executed along three data unit boundaries.

Shifted key values can be provided by hard-wired data paths represented in brackets. Thus, a first key, KEY0, can correspond to applied data units FB38:FB0, a second key, KEY1, can correspond to applied data units FB39:FB1, a third key, KEY2, can correspond to applied data units FB40:FB2, and a fourth key, KEY3, can correspond to applied data units FB41:FB3.

In the particular example, shown a group ID value "GID" can be provided, and can accompany each of shifted key values KEY0 to KEY3.

While a CAM block utilized in embodiments shown herein can take various forms, the embodiments of FIGS. 13 and 14 show an arrangement in which sets of key values can be provided as applied search key data. In very particular embodiments, CAM blocks can include input key MUXs for selecting any of such multiple applied key values. One particular example of such an arrangement is shown in FIG. 15.

Figure 15:
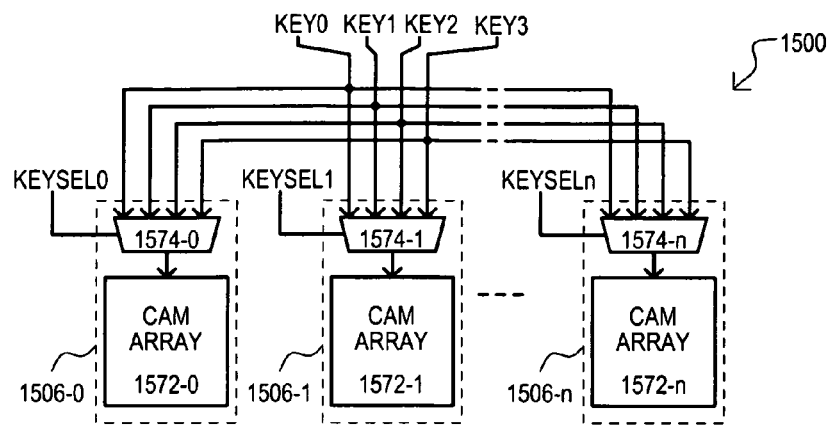
FIG. 15 is a block schematic diagram of a CAM block that can be included in the embodiments.

Referring to FIG. 15, a CAM sub-system is shown in a block schematic diagram and designated by the general reference character 1500. A CAM sub-system 1500 can include a number of CAM blocks 1506-0 to 1506-$n$, each of which can receive four applied search key values KEY0 to KEY3. Each CAM block (1506-0 to 1506-$n$) can include a CAM cell array 1572-0 to 1572-$n$ and CAM input MUX 1574-0 to 1574-$n$. Each CAM input MUX (1574-0 to 1574-$n$) can selectively input one of the search key values (KEY0 to KEY3) in response to a corresponding key selection value KEYSEL0 to KEYSEL$n$.

Such an arrangement can allow for different key values to be applied to different CAM blocks, for versatility in search operations. For example, if key values (KEY0 to KEY3) are provided in a manner like that shown in FIG. 14, key selection values (KEYSEL0 to KEYSEL$n$) can be used to apply shifted key values across different CAM blocks having replicated databases. In contrast, in a "standard" search operation, non-shifted search keys can be applied to fewer or greater numbers of CAM blocks as desired.

In this way, CAM blocks can include input MUXs that can selectively input any of multiple search key values, where such search key values can be contiguous portions of a same data set, but shifted with respect to one another by different amounts of data units.

Various embodiments described above have shown arrangements in which differently shifted search key values can be applied in parallel to multiple CAM blocks. However, alternate embodiments can include a serial shifting of a search key value. One such arrangement is shown in FIG. 16.

Figure 16:
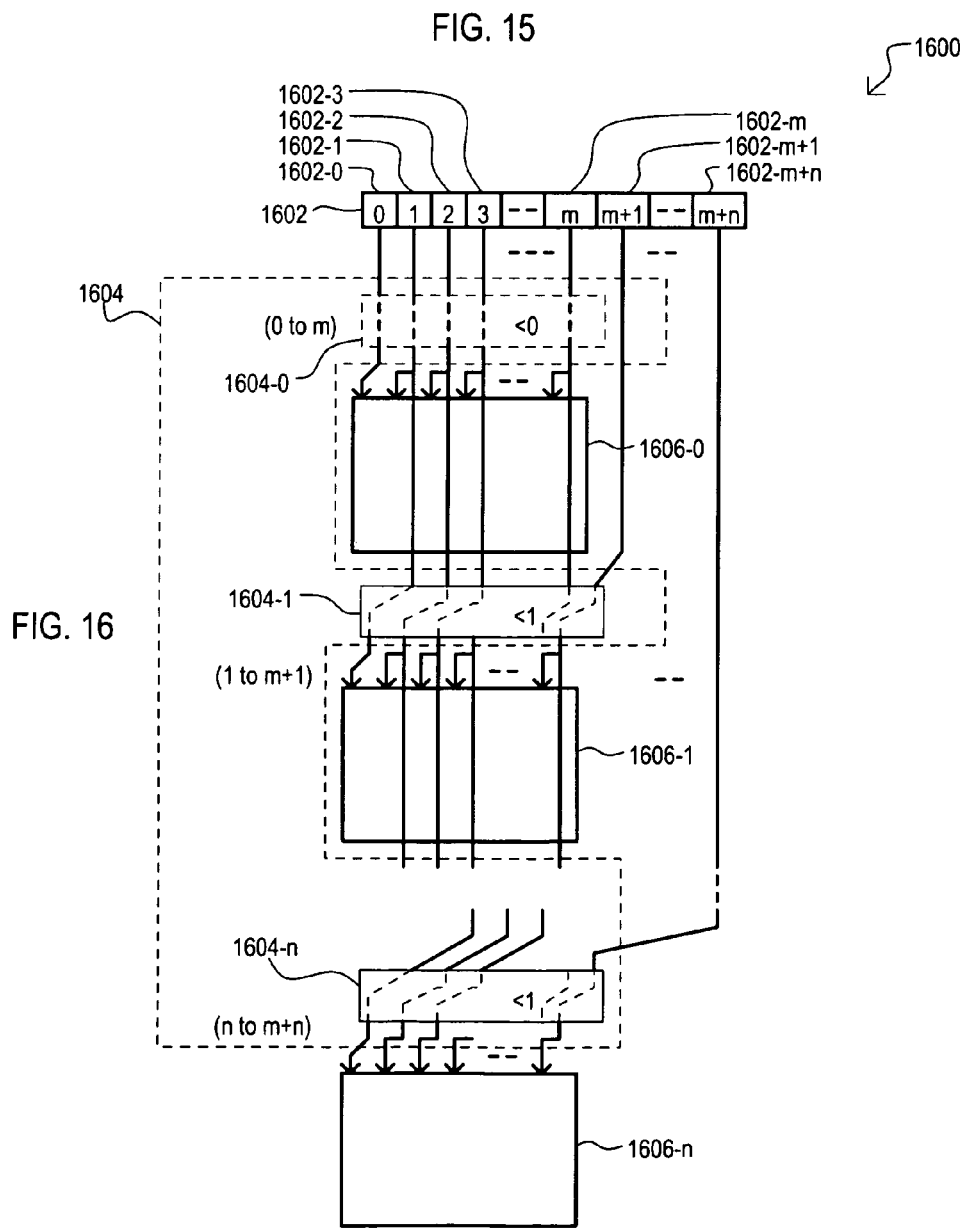
FIG. 16 is a block schematic diagram of a system according to an alternate embodiment.

Referring to FIG. 16, a system according to an alternate embodiment is shown in a block schematic diagram and designated by the general reference character 1600. A system 1600 can include a search key input 1602, a shifting section 1604, and a number of CAM blocks 1606-0 to 1606-$n$. As in the case of FIG. 1, a search key input 1602 can be divided into a number signal sets, shown as 1602-0 to 1602-$m+n$, with each signal set (1602-0 to 1602-$m+n$) receiving multiple bits in parallel and having a logical order with respect to one another.

A shift section 1604 can connect various signal sets to each CAM block (1606-0 to 1606-$n$), that are shifted from one another with respect to the logical order of such sets. However, unlike the arrangement of FIG. 1, such shifting can be done in series, with shift units 1604-0 to 1604-$n$ being arranged in series with one another, and trailing data units being provided as needed to each CAM block (1606-0 to 1606-$n$).

In this way, shifted contiguous search key values can be applied to CAM blocks in series, by serially shifting search key data.

Figure 17:
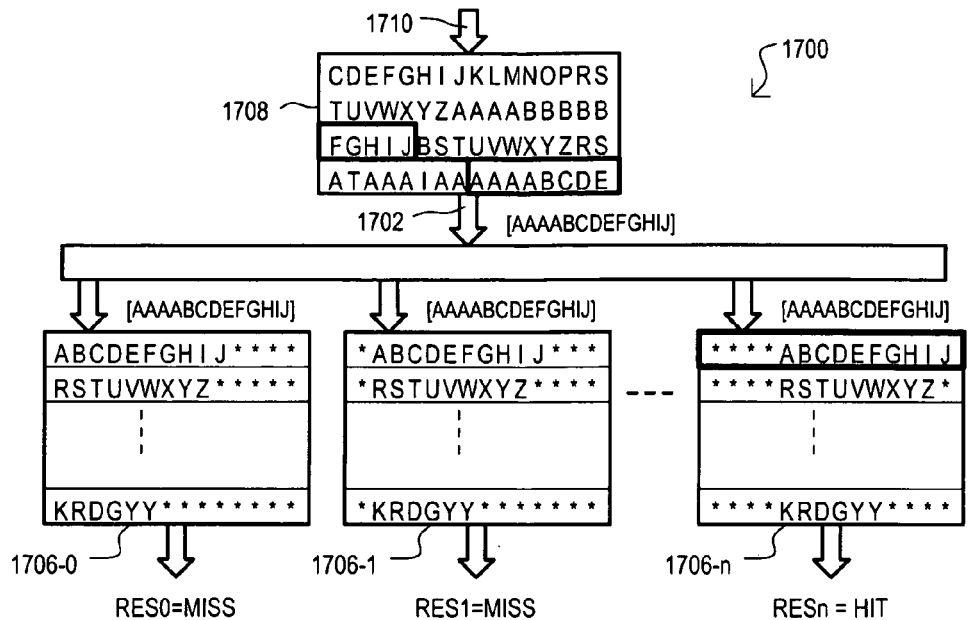
FIG. 17 is a block schematic diagram of a system according to another alternate embodiment.

Referring now to FIG. 17, a system according to another alternate embodiment is shown in a block schematic diagram and designated by the general reference character 1700. System 1700 can include a search key input 1702, CAM blocks 1706-0 to 1706-3, and a context buffer 1708.

Unlike the embodiments described above, a system 1700 does not shift search key data. Instead, databases replicated within each CAM block (1706-0 to 1706-3) are shifted with respect to one another. Thus, data within CAM block 1706-0 is not shifted. However, data in CAM block 1706-1 is shifted by one data unit with respect to that of CAM block 1706-0, with a first data unit of each entry being masked. Such a data shifting placement continues with CAM block 1706-3 having entries with the leading three data units being masked.

A same search key can be applied to each CAM block (1706-0 to 1706-3), but due to the arrangement of data within such CAM blocks, the search is shifted with respect to the stored data values.

In this way, data of a same database can be replicated in multiple CAM blocks, but shifted with respect to one another within such CAM blocks.

The embodiment of FIG. 17 shows an arrangement in which same data values can be stored in CAM blocks, but shifted with respect to one another. Such shifting can include a masking of data values in a columnwise direction within each CAM block. While such masking can be accomplished with local masking using ternary CAM cells, alternate embodiments can utilize a global masking arrangement for such columnwise masking. An example of such an arrangement is shown in FIG. 18.

Figure 18:
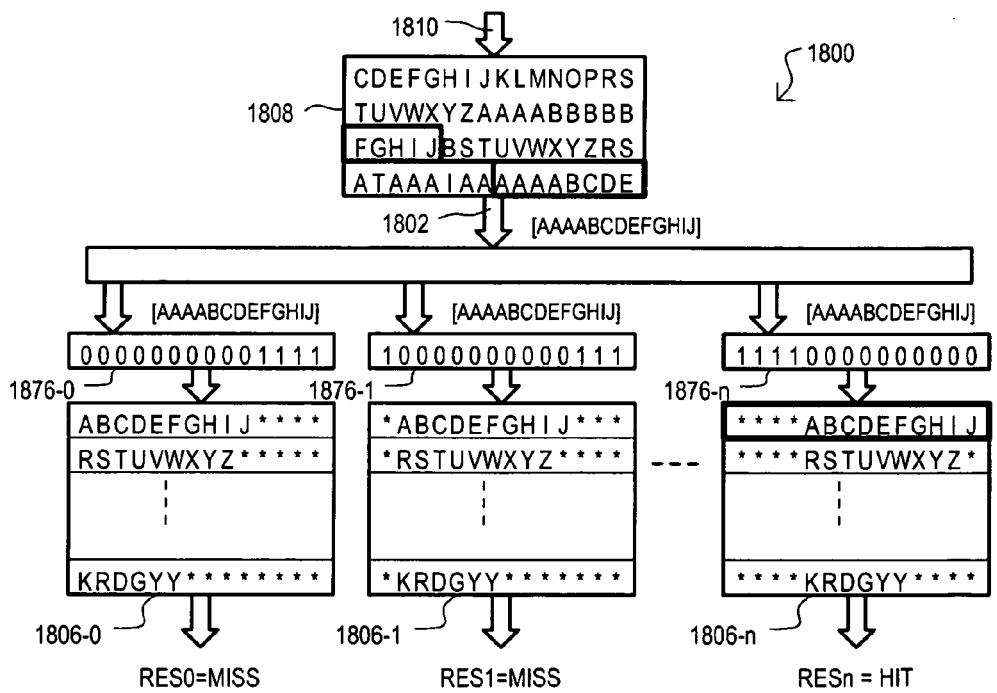
FIG. 18 is a block schematic diagram of a system according to yet another alternate embodiment.

FIG. 18 shows a system 1800 providing data storage shifting like that of FIG. 17. However, unlike FIG. 17, CAM blocks (1806-0 to 1806-3) can each include a corresponding global mask register (GMR) 1876-0 to 1876-*n*. GMRs (1876-0 to 1876-*n*) can mask search operations along a columnwise direction. As but one example, compare data lines that apply data values to CAM cells within a CAM block can be driven to predetermined levels that force a match result. Thus, each GMR (1876-0 to 1876-3) can be programmed to provide global masking for its corresponding CAM block (1806-0 to 1806-3) according to the amount by which data is shifted. In the particular example shown, a value "1" represents masking of one data unit of search key data.

In this way, data of a same database can be replicated in multiple CAM blocks, but shifted with respect to one another within such CAM blocks, and globally masked according to the amount of shifting.

Embodiments described above have shown arrangements in which a same database is replicated within each of multiple CAM blocks. However, alternate embodiments can reduce the amount of storage needed to search a given database by replicating only selected search values across multiple CAM blocks. Particular examples of such embodiments will now be described.

Figure 19:
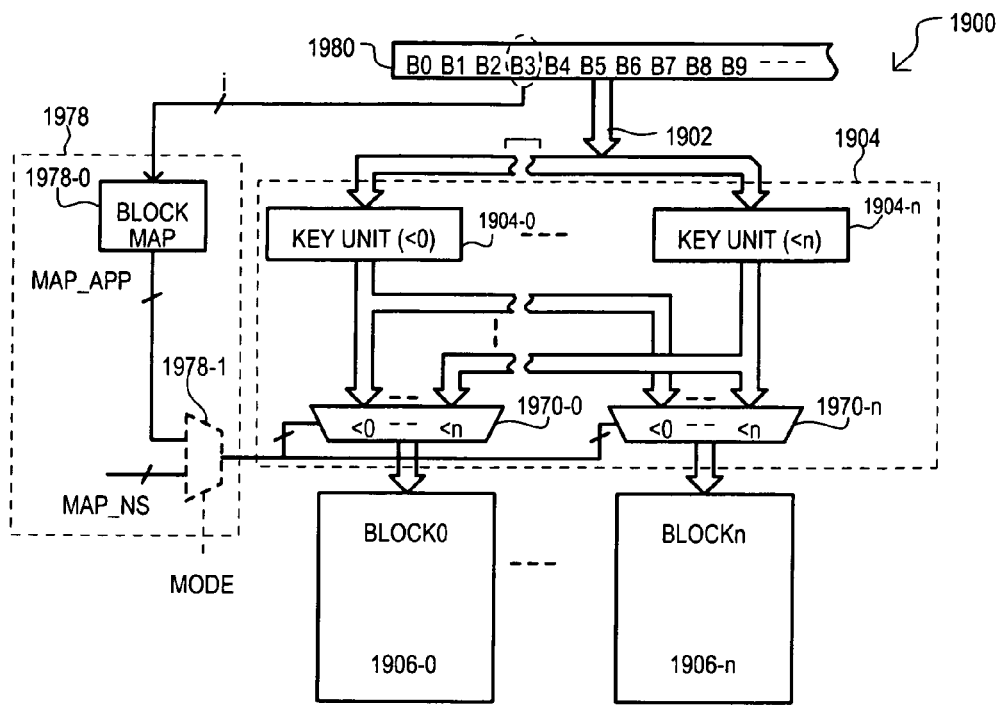
FIG. 19 is a block schematic diagram of a system according to another embodiment of the invention.

Referring now to FIG. 19, a system according to another embodiment is shown in a block schematic diagram and designated by the general reference character 1900. System 1900 can include many of the features as that shown in FIG. 2. However, all database values (e.g., string values for comparison against applied search keys) are not replicated across each CAM block (1906-0 to 1906-*n***). As a result, a same rapid stream search capability can be accomplished with less storage area for the string database. That is, a string database can be partitioned among CAM blocks, rather than replicated in each CAM block.

A system 1900 can differ from that of FIG. 2 in that mapping of "shifted" search key values to particular CAM blocks can vary in response to the incoming stream of search data. Thus, system 1900 can include a shift section 1904 that can enable any of multiple shifted search key values to be applied to any of CAM blocks (1906-0 to 1906-*n*). A mapping circuit 1978 can control the operation of shift section 1904 based on examining a particular portion of the incoming data stream 1980**.

In the particular example of FIG. 19, a shift section 1904 includes shift circuits 1904-0 to 1904-*n* and output MUXs 1970-0 to 1970-*n*. Shift circuits (1904-0 to 1904-*n*) can provide n+1 key values, each representing a portion of the data stream 1980 shifted by a predetermined amount with respect to one another. In the example shown, an output of each shift section 1904 can provide a shifted key value to one input of each output MUX (1970-0 to 1970-*n*). As a result, each output MUX (1970-0 to 1970-*n*) can provide any of the shifted key values to its corresponding CAM block (1906-0 to 1906-*n*).

A mapping circuit 1978 can control how shifted search key values are applied to CAM blocks (1906-0 to 1906-*n*). More particularly, a mapping circuit 1978 can examine a section of a data stream 1980 common to each shifted search key value (albeit, occurring at different bit positions within each shifted search key), and from this value, determine how shifted search keys are applied to the CAM blocks. In the very particular example of FIG. 19, an incoming data stream 1980 includes sections B0 to B9 (which can be bytes, as but one example). It is assumed that shift circuits (1904-0 to 1904-*n*) shift data stream values by increasingly larger amounts to generate shifted search keys, thus shift circuits 1904-0, 1904-1, 1904-2 and 1904-3 can provide shifted search keys starting with sections B0, B1, B2, and B3, respectively. Section B3 is common to all such shifted search key values, and is examined by mapping circuit 1978 to control which shifted search keys are applied to which CAM blocks.

The particular mapping circuit 1978 of FIG. 19 includes a block mapper 1978-0, and, optionally, a shift mode MUX 1978-1. A block mapper 1978 can map each possible combination of the examined section of the data stream (in this case B3) to a particular control signal value MAP_APP. MAP_APP can control the configuration of output MUXs (1970-0 to 1970-*n***). Preferably, the number of possible variations in the examined section (e.g., B3) is mapped to a smaller number of MUX configurations, preferably, mapped to the number of CAM blocks. That is, if the number of bits in the examined section is "B", all combinations of B ($2^B$) can be mapped to n+1 combinations, where B>$\log_2$(n+1).

An optional shift mode MUX 1978-1 can receive mapping control signals MAP_APP as well as non-shift mapping signals MAP_NS as input values, and output one such set of values to output MUXs (1970-0 to 1970-*n*). Non-shift mapping signals MAP_NS can provide one or more predetermined path configurations between a search key input 1902 and CAM blocks (1906-0 to 1906-*n*). As but one example, non-shift mapping signals can enable key values to be applied to CAM blocks (1906-0 to 1906-*n***) in non-shifted forms.

In this way, a system can map shifted search key values in various ways to CAM blocks in response to a portion of a data stream common to all such shifted search key values.

A block mapper 1978-0 that examines a portion of a data stream can take various forms. For example, if a database to be searched is known, mapping values can be tailored to such stored data values, to minimize the overall storage space required. Alternatively, mapping values can be generated in a random or essentially random fashion. As but one example, mapping values can be based on hashing function that hashes a first set of values (possible values of the monitored portion of the data stream) into a smaller set (number of CAM blocks).

Figure 20A:
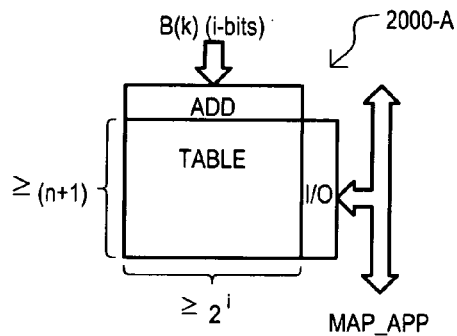
FIGS. 20A and 20B are block schematic diagrams of block mappers that can be included in the embodiments.
Figure 20B:
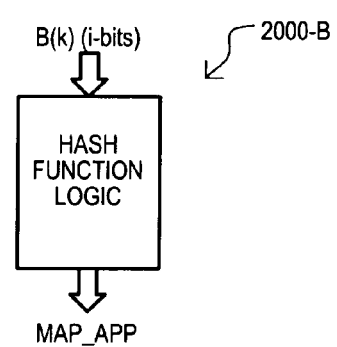

Two possible examples of block mapper 1978-0 are shown in FIGS. 20A and 20B. Referring to FIG. 20A, a block mapper 2000-A can have the form of a programmable look-up table (LUT). Block mapper 2000-A can include, at a minimum, a number of entries greater than or equal to possible variation in the portion of the data stream that is examined. For example, if an examined data stream section is 8-bits, and all bit combinations are possible, a block mapper 2000-A can include $2^8$ or more entries. Each entry of a LUT block mapper 2000-A can store a value that can identify any of the CAM blocks. For example, if there are 4 CAM blocks, LUT block mapper 2000-A entries can store values of 2 or more bits. Of course, alternate embodiments can examine fewer or greater than 8-bits of a data stream and provide correspondingly larger sized mapping values.

In the particular example of FIG. 20A, a LUT block mapper 2000-A can be programmable, in that particular mapping values can be loaded into the LUT. A programmable LUT can advantageously allow a mapping set of values to be optimized for an expected data set. However, alternate embodiments can include a mapping arrangement that is "hardwired" into an integrated circuit device.

Referring to FIG. 20B, a block mapper 2000-B according to another embodiment is shown in a block diagram. A block mapper 2000-B can include logic circuits for providing a mapping function. More particularly, a block mapper 2000-B can include circuits that execute a hashing operation that hashes all "B" bit value (number of bits examined in data stream) to one of the CAM blocks (e.g., 0 to n).

To better understand features of string database partitioning, particular examples of mapping arrangements will now be described.

Figure 21:
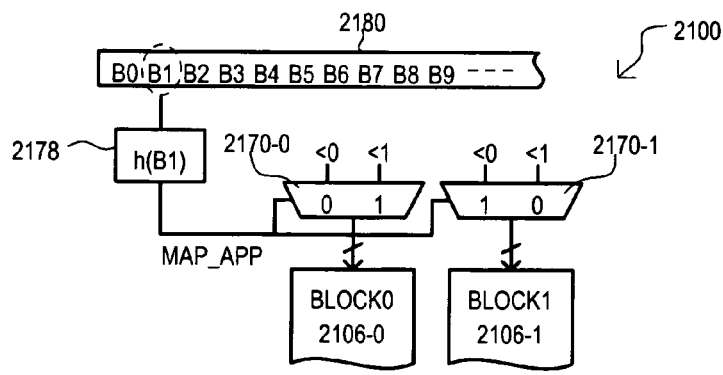
FIG. 21 is a block schematic diagram of a system according to a particular embodiment.

Referring to FIG. 21, a shift arrangement like that of FIG. 19 is shown in a block schematic diagram, and designated by the general reference character 2100. FIG. 21 shows an arrangement in which the number of CAM blocks is 2 (e.g., n=1). In such an arrangement, shifted search key values are generated by stepping through data stream 2180 in steps of two. A block mapper 2178 can examine a last data group (e.g., byte) in the "stepped" group. Thus, in FIG. 21, in a first search operation, data group B1 is examined. In a second search operation, data group B3 is examined, etc. A block mapper 2178 can map all possible values of an examined section of the data stream (e.g., B1, B3 . . . ) into a MAP_APP value of "0" or "1".

As shown by output MUXs 2170-0 and 2170-1, the order by which shifted search values are applied to a corresponding CAM blocks will vary according to map value generated by block mapper 2178. In the arrangement of FIG. 21, if MAP_APP=0, a search key value shifted by zero (<0) is applied to CAM block 2106-0 while a search key value shifted by one data set (<1) is applied to CAM block 2106-1. However, if MAP_APP=1, a search key value shifted by zero (<0) is applied to CAM block 2106-1 while a search key value shifted by one data set (<1) is applied to CAM block 2106-0.

Figures 22A, 22B:
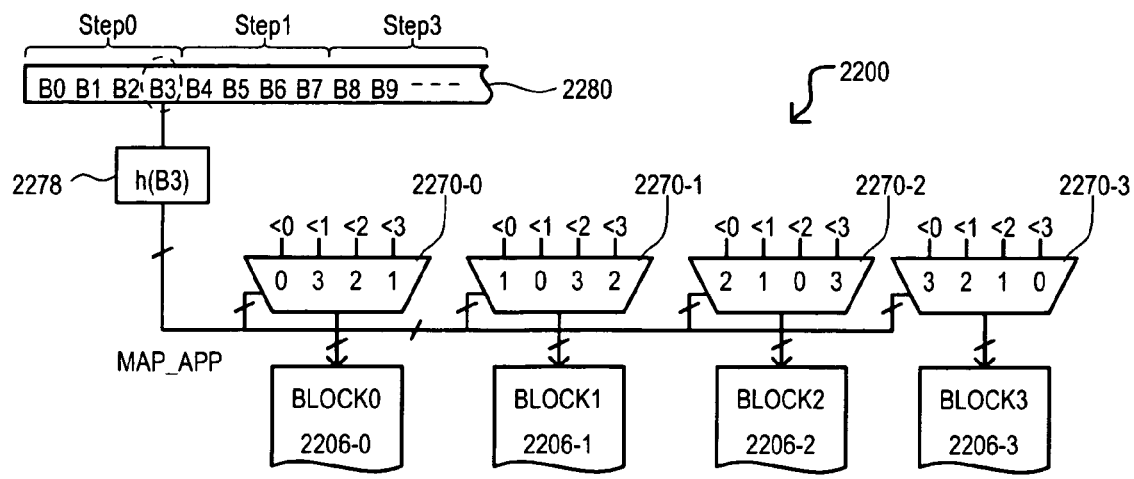
FIG. 22A is a block schematic diagram of another system according to a particular embodiment.
FIG. 22B is table showing how shifted search values can be applied to different CAM blocks by using a portion of the data stream as a mapping value.

Referring to FIG. 22A, a shift arrangement like that of FIG. 19 is shown in a block schematic diagram, and designated by the general reference character 2200. FIG. 22A shows an arrangement in which the number of CAM blocks is 4 (e.g., n=3). In this example, four shifted search keys are generated by stepping through a data stream in groups of four. A last data set is examined based on such a step size. Thus, in the example shown, in a first search operation, data group B3 is examined. In a second search operation, data group B7 is examined, etc.

As shown by output MUXs 2270-0 to 2270-3, the order by which shifted search key values are applied can vary according to mapping value MAP_APP output from block mapper 2278. In the particular example shown, mapping can occur as shown in the table of FIG. 22B.

As noted previously, data dependent mapping arrangement like that described herein can allow for non-replication of particular data values in a search data base. In particular, based on mapping variations in a leading portion of a data stream (common to all shifted search data keys), a data value may not be replicated. A number of examples will now be described to illustrate this feature.

Referring to FIG. 23, a portion of a mapping function is shown in a table. As shown, if an examined data unit (Bn) of the data stream is "A", it will map to "0". If an examined data unit (Bn) is "B", it will map to "1". FIGS. 24A to 24B shows various results for combinations of mapping values.

FIGS. 24A and 24B show how a classifying arrangement like that of FIG. 21, can require non-replication of particular data values across CAM blocks. As shown in FIG. 24A, if the examined two data units (e.g., bytes) of a searched string map (e.g., hash) to different values, such a string need not be replicated in both CAM blocks, as a matching search key portion will be applied by output MUXs to a same CAM block, regardless of where such a search key occurs in the data stream. FIG. 24A shows how string ABCD need only be replicated in BLOCK 1. Similarly, FIG. 24B shows how string BACD need only be replicated in BLOCK 0.

In contrast, FIGS. 24C and 24D show how a classifying arrangement like that of FIG. 21, can still require replication of other particular data values across all CAM blocks. As shown in FIG. 24C, if the examined two data units of a searched string map (e.g., hash) to a same value (in this case 0), unless such a string is replicated in both blocks (BLOCK 0 and BLOCK 1), the string could be missed depending upon where it occurs in a data stream. FIG. 24D shows a similar "must" replicate case when leading sections of a string both map to "1".

FIGS. 24A to 24D illustrate an arrangement in with two CAM blocks. However, the same principle is applicable to multiple CAM blocks.

Figures 25, 26A, 26B:
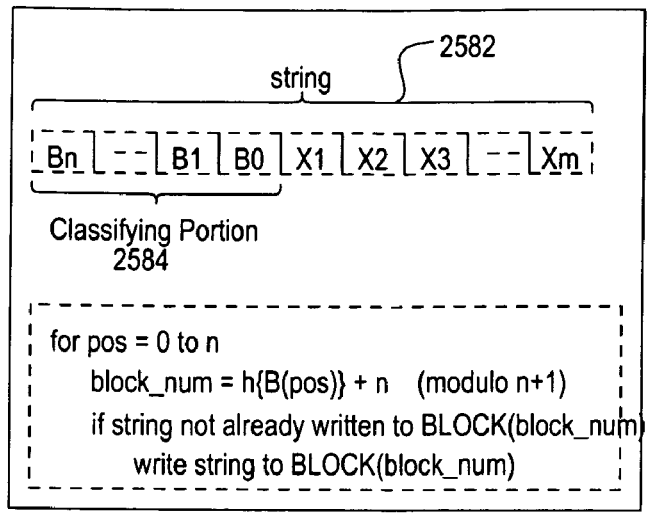
FIG. 25 shows how string values of a database can be classified for storage in less than all CAM blocks.
FIGS. 26A and 26B are tables showing very particular examples of classifying string values for a system having two CAM blocks, and a system having four CAM blocks.

Referring to FIG. 25, an approach to storing search strings with selective non-replication is shown in a diagram. FIG. 25 shows a sample string 2582 for storage in one or more CAM blocks. A sample string 2582 can include a classifying portion 2584 composed of n+1 sections (e.g., bytes), where n+1 is also the number of CAM blocks. Sections of the classifying portion are identified as B0 to Bn. FIG. 25 also shows method steps for determining which CAM block(s) (any of BLOCK0 to BLOCK(n+1)), a string should be stored in.

For each section of the classifying portion (e.g., pos=0 to n), a block number (block_num) can be generated according to the operation $$\text{block\_num} = h\{B(\text{pos})\} + n \text{ modulo}(n+1)$$

where h{ } can be a mapping function as described above (e.g., data set dependent hashing function, random hashing function, etc.).

If the string has already been written to the current block number, a next section of the classifying portion can be examined. Otherwise, the string can be written to the generated block number.

If string not already written to BLOCK(block_num) write string to BLOCK(block_num)

Because different sections of the same classifying portion can generate a same value block_num, a string may not be written to one or more blocks. That is, the string need not be replicated across all blocks.

Referring to FIGS. 26A and 26B, two tables show examples of the generation of block_num values according to the approach in FIG. 25. FIG. 26A shows the case where n=1. FIG. 26B shows a case where n=3. Both arrangements show cases where a mapping function h{ } can be an essentially random function.

In this way, particular string values can be written to only selected of multiple CAM blocks, thus eliminating a need to replicate all strings over all CAM blocks.

While FIGS. 21 and 22A/B have shown arrangements in which the number of CAM blocks is two and four, respectively, alternate embodiments can include different numbers of CAM blocks, and/or repeat the replicating approach multiple times. One such example is shown In FIG. 27.

Referring to FIG. 27, a system is shown in a block schematic diagram and designated by the general reference character 2700. A system 2700 can include the same general arrangement as FIG. 22, but replicated in parallel across four CAM blocks. Thus, two block mappers 2778-0 and 2778-1 can be included, along with corresponding sets of output MUXs 2770-0/1 and 2770-2/3. Block mapper 2778-0 can control whether a search key value shifted by zero (<0) or one data unit (<1) is applied to CAM blocks 2706-0 or 2706-1, based on a value at a second data unit location (B1). Similarly, block mapper 2778-1 can control whether a search key value shifted by two (<2) or three data units (<3) is applied to CAM blocks 2706-2 or 2706-3 based on value at a fourth data unit location (B3).

In this way shifting approaches that do not use full database replication can be repeated in parallel over multiple CAM blocks.

While embodiments above have shown circuits for applying shifted search key values to a database that is not completely replicated across all CAM blocks, embodiments can also include circuits for classifying string values for search (i.e., values that are stored in the CAM blocks) during a write operation. That is, embodiments can include circuits for writing string values "on-the-fly" into selected CAM blocks. One particular example of such an approach is shown in FIG. 28.

FIG. 28 shows a system 2800 that includes multiple CAM blocks 2806-0 to 2806-n, a write data register 2886, write data classifier 2888, and a write circuit 2890. CAM blocks (2806-0 to 2806-n) can store string values to be searched against shifted search key data. A system 2800 can include circuits for generating and applying such shifted search key data to the CAM blocks (2806-0 to 2806-n) according to embodiments show above and equivalents.

A write data register 2886 can receive string data to be written into one or more CAM blocks. Preferably such string data can include a length indication, indicating the size of the string (i.e., number of bytes).

A write data classifier 2888 can examine a classifying portion 2854 of a string, and based upon such data, determine which CAM blocks should receive the incoming write data. As but one example, such a determination can be made as shown in FIGS. 25 to 26B. Accordingly, a write data classifier 2888 can generate a write block signal WR_BLK0 to WR_BLKn for each CAM block (2806-0 to 2806-n). Write circuit 2890 can receive write block signals (WR_BLK0 to WR_BLKn), and based upon such signals, can write or not write a data value held within write data register 2886 to a given CAM block (2806-0 to 2806-n). In many cases, a string database partially replicated across CAM blocks (2806-0 to 2806-n) can have a priority based on string length. Consequently, in a preferred arrangement, write operations can be string length sensitive, writing a given string value into a CAM block based on its length. As but one example, a write circuit 2890 can have a size based next free address for each CAM block (2806-0 to 2806-n). As another example, CAM entries may have one or more data fields in addition to the string itself for storing a string size indication. Such a value can then be used to prioritize from among multiple matches in a given CAM block.

In this way, string values can be written into selected blocks of a CAM device based on a classifying portion of the string, where the classifying portion includes consecutive bit locations, common to each string.

In the above arrangements, in which a database to be searched is only partially replicated across CAM blocks, the amount of storage needed for a database can be reduced significantly. FIG. 29 is a table showing database savings that can occur with an essentially random replication approach (e.g., random hashing of eight bit values into the number of CAM blocks). FIG. 29 includes a column "S" which can be a speed-up factor of a search rate as compared to approaches that compare strings against a single, non-replicated database. A value "S" is also equal to the number of CAM blocks utilized for search operations. A column "Full Replication Size" which shows the amount of data base replication needed for an approach that replicates a database over all CAM blocks. A column "Random Replication" shows an approximate amount of database replication needed for a random classification of strings according to approaches like those above.

The above embodiments, whether completely replicating or fully replicating a database over multiple blocks, can provide a constant search rate. This rate is shown, for example, as "S" in FIG. 29. However, other embodiments can provide non-replication of a database but not provide a constant search rate. Particular embodiments of such approaches will now be described with reference to FIGS. 30-31C.

Referring to FIG. 30, a system according to another embodiment is shown in a block diagram and designated by the general reference character 3000. A system 3000 can include CAM blocks (3006-0 to 3006-3), a mapping circuit 3078, and output MUXs 3070-0 to 3070-3. CAM blocks (3006-0 to 3006-3) can store a string database to be searched. However, searched values are not replicated. In the particular example of FIG. 30, strings can be placed into a particular block according to an operation function h( ) on a first section S0 (e.g., a first byte) of each string.

A mapping circuit 3078 can execute the function h(0) on each section of an examined portion, which in this case is shown as B0, B1, B2, B3. According to such results, a shifted search key values can be applied to a given CAM block. A mapping circuit 3078 can include a block mapper 3078-0 to 3078-3 corresponding to each data unit of the examined portion of the data stream (in this case four). A MUX logic circuit 3078-4 can generate control signals for selectively applying any of shifted search data values (symbolized by <0, <1, <2, <3). However, unlike embodiments above that can provide an essentially constant rate, the rate at which a system 3000 can search can depend upon whether a mapping operation by mapping circuit 3078 generates mapping "conflicts". A mapping conflict can occur when two different shifted search key values of the same operation map to a same CAM block. This aspect of such an approach is illustrated in FIGS. 31A to FIG. 31C.

Figure 31A:
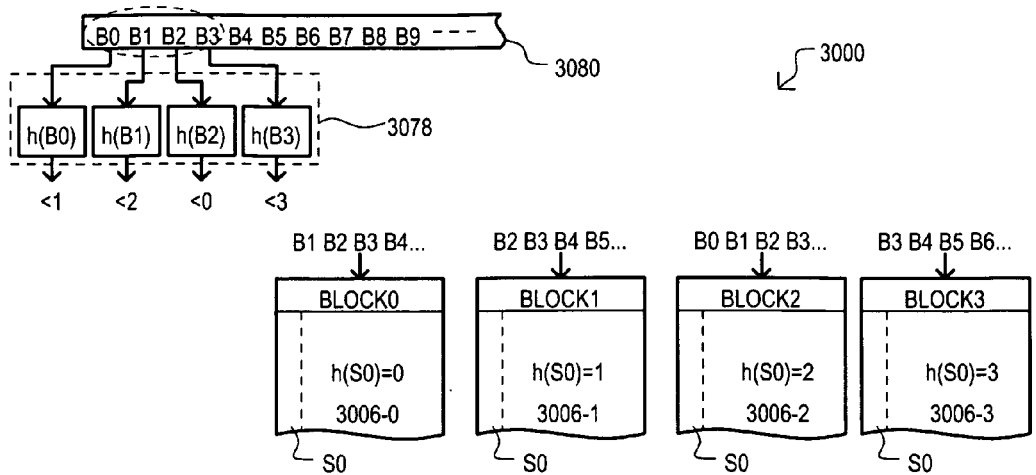
FIGS. 31A to 31C are block diagrams illustrating various operations of the system shown in FIG. 30.

Referring to FIG. 31A, portions of the system 3000 of FIG. 30 are shown in a block diagram. FIG. 31A illustrates an ideal case where each shifted search key value maps to a different CAM block. As a result, following the search operation shown, a data stream can be advanced by another four data units (e.g., bytes).

Figure 31B:
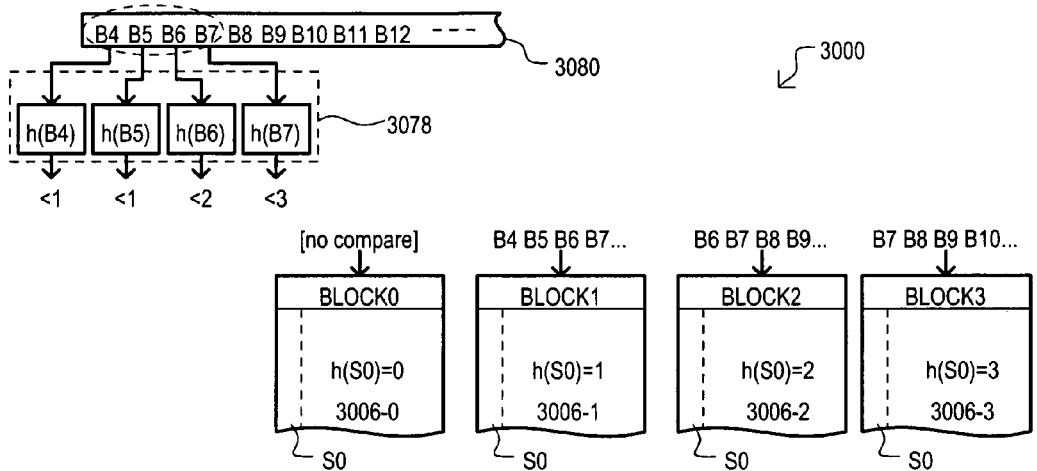
Figure 31C:
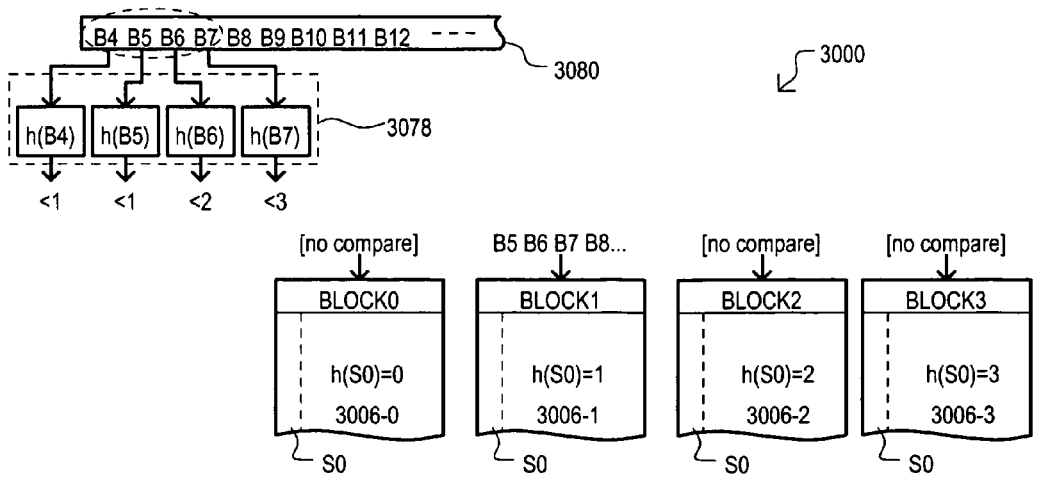

Referring to FIGS. 31B and 31C, search operations subsequent to that of FIG. 31A are shown in block diagrams. As shown in FIG. 31B, a data stream has been advanced, resulting in consecutive sections B4, B5, B6 and B7 being examined by mapping circuit 3078. Unlike the search operation of FIG. 31A, in FIG. 31B, a conflict arises, as shifted search key value B4, B5, B6 . . . (stream section shifted by zero units) maps to a same CAM blocks as shifted search key value B5, B6, B7 . . . (stream section shifted by one unit). Consequently, the search of one such shifted search key value must be deferred until the other one is complete. In the very particular example of FIG. 31B, it is the former search key value that is applied (stream section shifted by zero units). Because no shifted search key generates h( )=<0, no search key is applied to CAM block 3006-0.

FIG. 31C shows one possible search operation subsequent to that shown in FIG. 31B. The conflicting shifted search key value (stream section shifted by one unit) is now applied to the appropriate CAM block, while other CAM blocks are not searched.

Of course, from the above discussion a worst case search scenario can occur when all shifted search keys map to a same CAM block. In such a case, a search rate can drop back to S=1 (no different than a serial application of values to one non-replicated database). However, provided string values are sufficiently distributed among CAM blocks, and an incoming data stream can be expected to map to different blocks, search speed improvements can be made over approaches that sequentially apply search key values to one database.

In this way, an incoming data stream can be shifted and applied in parallel to search a database that is not replicated over multiple CAM blocks.

It is understood that the embodiments of the invention may be practiced in the absence of an element and or step not specifically disclosed. That is, an inventive feature of the invention can be elimination of an element.

Accordingly, while the various aspects of the particular embodiments set forth herein have been described in detail, the present invention could be subject to various changes, substitutions, and alterations without departing from the spirit and scope of the invention.

What is claimed is:

1. A data stream search system, comprising:
a plurality of search data inputs logically divided into at least M+N sets, the sets having a logical order with respect to one another, each set providing more than one bit value; and
a key application circuit comprising a plurality of data paths each configured to couple a different group of at least M data input sets to a corresponding content addressable memory (CAM) section, each different group of at least M data input sets being contiguous with respect to the logical order and shifted in bit order from one another by at least two bits; wherein
the plurality of data paths comprises at least two data shift circuits configured to receive the M+N sets in parallel, each data shift circuit configured to shift the M+N sets by a selectable amount to provide M sets of bit values to the corresponding CAM section, and M and N are integers greater than zero.

2. The system of claim 1, wherein:
the at least M+N sets are coupled in parallel to each data path.

3. The system of claim 1, wherein:
the key application circuit comprises a stepping multiplexer (MUX) circuit having
an output to provide the at least M+N sets to each data path, and
a plurality of inputs, each input coupled to different group of M+N sets, each group of M+N sets being contiguous with respect to the logical order and bit shifted with respect to one another by multiple sets.

4. The system of claim 3, wherein:
the stepping MUX has a control input coupled to receive a step control signal that sequentially selects groups of M+N sets separated from one another by N sets in the logical order.

5. The system of claim 3, wherein:
the key application circuit further comprises an input MUX having an output to provide the groups of M+N sets to the stepping MUX and an input coupled to receive a plurality of sets.

6. The system of claim 3, wherein:
the plurality of data paths comprises at least first and second data shift circuits arranged in series with one another, the first data shift circuit configured to output sets to its corresponding CAM section and to the second data shift circuit, the second data shift circuit configured to shift bit locations of the received sets from the first data shift circuit and output such sets to its corresponding CAM section.

7. The system of claim 1, wherein:
the key application circuit includes
a shifting section configured to shift data received at the search inputs by different amounts in the logical order to generate the groups of at least M data input sets,
a shift select multiplexer (MUX) section configured to apply one of the groups of M data input sets to a corresponding CAM section in response to MUX control data, and
a mapping circuit configured to generate MUX control data in response to bit values of at least one of the first N search data input sets of the logical order.

8. The system of claim 7, wherein:
each search data input set comprises a plurality of B bits;
the number of CAM sections is less than $2^B$; and
the mapping circuit is configured to map a received value of B bits to one of the CAM sections.

9. The system of claim 7, wherein:
the mapping circuit comprises a look-up table having at least $2^B$ entries, each accessible by a different combination of B bit values.

10. The system of claim 7, wherein:
the mapping circuit comprises a hash function circuit configured to hash different combinations of B bit values into values of less than B bits.

11. The system of claim 1, further including:
a stitching section comprising combining logic configured to logically combine match results between predetermined entries of each CAM section to generate a match indication representing a match with a search key value larger than a size of a CAM entry within the CAM sections.

12. The system of claim 1, wherein:
the application circuit is configured to apply a first part of an applied search key value to the CAM sections in parallel, and the CAM sections include a priority encoder circuit configured to generate at least one index value in response to matches generated by entries with the CAM sections; and
the system further includes a stitching section that includes
a memory circuit having a plurality of locations accessible according to an applied address, the memory circuit having an address input coupled to receive at least a portion of the one index value from the priority encoder circuit, and
a compare circuit configured to compare data values output from the memory circuit to a second part of the applied search key value.

13. The system of claim 12, wherein:
the application circuit includes a selector control configured to sequentially apply consecutive parts of an applied search key value to the CAM sections in parallel, and the CAM sections include a priority encoder circuit configured to generate at least one index value in response to matches generated by entries with the CAM sections; and a stitching section that includes a memory circuit coupled to receive index values from the priority encoder circuit and configured to generate a match value in response to predetermined sets of index values.

14. The system of claim 1, further including:
a context buffer comprising a dual port memory circuit having a first port coupled to a data stream source, and a second port coupled to provide the search data inputs.

15. A method of searching a data stream for predetermined data patterns, comprising the steps of:
(a) storing a same set of search data patterns in multiple content addressable memory (CAM) blocks including storing each search data pattern in at least one CAM block according to characteristics of a classifying section of the search data pattern, the classifying section of each search data pattern including the same bit positions within each search data pattern;
(b) within each CAM block, comparing portions of the data stream to the search data patterns, the portions of the data stream being shifted by different amounts with respect to one another; and
(c) generating a match indication when a portion of the data stream matches at least one of the search data patterns.

16. The method of claim 15, wherein:
step (a) includes storing the same search data patterns in multiple CAM blocks.

17. The method of claim 15, wherein:
step (b) includes, applying each portion of the data stream to a different CAM block according to mapping bits of each such portion, the mapping bits being at the same bit locations in each portion.

18. The method of claim 17, wherein:
step (b) includes mapping different combinations of the mapping bits to one particular CAM block, the number of different combinations being greater than the number of CAM blocks.

19. The method of claim 15, wherein:
the data stream comprises multi-bit data units;
each search data pattern comprises at least one multi-bit data unit; and
the portions of the data stream are shifted by consecutively larger numbers of data units between CAM blocks.

20. The method of claim 15, further including:
storing the same search data patterns in multiple CAM blocks includes storing a first portion of at least a first search data pattern in each of the CAM blocks;
comparing a portion of the data stream to the search data patterns includes applying a first portion of the data stream to the CAM blocks;
accessing a second portion of the at least first search data pattern in response to a match indication generated by applying the first portion of the data stream to the CAM blocks; and
comparing the second portion of the at least first search data pattern with a second portion of the data stream.

21. A search engine, comprising:
a context buffer comprising a plurality of addressable locations accessible for write operation by way of a write data port, and having a read data port to output read data;
a search circuit coupled to the context buffer and configured to apply different sections of the context buffer to different content addressable memory (CAM) array blocks in parallel, the different sections being a logically contiguous and overlapping one another with respect to the context buffer address; and
a group identification generator configured to generate a group ID value in response to a stream search command; wherein
the stream search circuit is configured to apply different sections of the context buffer in combination with the group ID value to different CAM array blocks in parallel.

22. The search engine of claim 21, further including:
an input multiplexer (MUX) corresponding to each CAM array block, each input MUX having inputs coupled to receive the different sections of the context buffer in parallel, and a control input for receiving select data for outputting one of the sections to the corresponding CAM array.

23. The search engine of claim 22, further including:
a block mapping circuit having an input coupled to receive data from a portion of the context buffer, and an output coupled to the control input of the input MUXs.

24. The search engine of claim 21, further including:
a command decoder configured to generate at least one stream search indication in response to the stream search command.

* * * * *